United States Patent [19]
Abrahamson et al.

[11] Patent Number: 5,002,491
[45] Date of Patent: Mar. 26, 1991

[54] ELECTRONIC CLASSROOM SYSTEM ENABLING INTERACTIVE SELF-PACED LEARNING

[75] Inventors: A. Louis Abrahamson; Frederick F. Hantline; Milton G. Fabert, all of Grafton, Va.; Michael J. Robson, Harare,

[73] Assignee: COMTEK, Grafton, Va.

[21] Appl. No.: 344,627

[22] Filed: Apr. 28, 1989

[51] Int. Cl.⁵ ............................................. G09B 3/00
[52] U.S. Cl. ................................. 434/322; 434/323; 434/324; 434/336; 434/350
[58] Field of Search ........................... 434/322–323, 434/335, 336, 350, 352, 362, 433, 327, 324

[56] References Cited

U.S. PATENT DOCUMENTS

| | | | |
|---|---|---|---|
| 3,491,464 | 1/1970 | Gray | 434/362 |
| 3,497,968 | 3/1970 | Ferris | 434/350 |
| 3,647,926 | 3/1972 | Rohloff et al. | 434/336 |
| 3,784,979 | 1/1974 | Friedman et al. | 434/350 X |
| 4,715,011 | 12/1987 | Brittan | 434/362 X |
| 4,715,818 | 12/1987 | Shapiro et al. | 434/350 X |
| 4,759,717 | 7/1988 | Larochelle et al. | 434/350 X |
| 4,764,120 | 8/1988 | Griffin et al. | 434/350 X |

FOREIGN PATENT DOCUMENTS

| | | | |
|---|---|---|---|
| 85/01854 | 4/1985 | PCT Int'l Appl. | 434/327 |
| 0736158 | 5/1980 | U.S.S.R. | 434/350 |

Primary Examiner—Robert Bahr
Assistant Examiner—Jennifer L. Doyle
Attorney, Agent, or Firm—Sughrue, Mion, Zinn, Macpeak & Seas

[57] ABSTRACT

An interactive electronic classroom system for enabling teachers to teach students concepts and to receive immediate feedback regarding how well the students have learned the concepts. Structure is provided for enabling students to proceed in lockstep or at their own pace through exercises and quizzes, responding electronically to questions asked, the teacher being able to receive the responses, and to interpret a readout, in histogram or other graphic display form, of student responses. In a preferred embodiment, a central computer using an IBM AT (tm) compatible system is employed, together with a plurality of student computers which range from simple devices to full fledged personal computers. Optical peripheral hardware, such as VCRs or other recording/reproducing devices, may be used to provide lessons to students in association with the computer network.

49 Claims, 24 Drawing Sheets

ELECTRONIC CLASSROOM SYSTEM ENABLING INTERACTIVE SELF-PACED LEARNING

BACKGROUND OF THE INVENTION

The present invention relates to a computer-based teaching system employing networking and computer assisted interactive techniques for enhancing a teacher's efficiency and effectiveness in a classroom. As will be discussed below, among its various attributes, the inventive system enables a teacher: (1) to monitor progress of a class more closely during each classroom session, and over each section of a course, than has been possible in the past; (2) to stimulate active participation by all students in a class; (3) to automate rollkeeping and the giving and grading of quizzes and homework; and (4) to utilize instructional videos and associated peripheral hardware interactively with the system. The invention thus integrates computers into the mainstream of the learning and grading process at educational institutions, with significant benefit to the classroom environment, including facilitated knowledge of student performance, and associated savings in routine paperwork.

There have been numerous techniques devised for enabling a teacher more easily to convey information and understanding to a class, and ultimately to relieve the teacher, to the greatest extent possible, of a number of the burdens associated with conveying that information to the class. Various electronically-based techniques have been implemented, but these have proved to be quite limiting or otherwise disadvantageous. In one sense, the techniques have been limiting in that interaction between the student and the teacher may be limited to responses to multiple-choice type questions, or to questions requiring only numerical answers. Examples of such systems include those described in U.S. Pat. Nos. 3,656,243; 3,694,935; 3,716,929; and 4,004,354. Such systems have been further limiting in that they have not provided any way of keeping accurate, detailed records for individual students for the duration of a given class.

Other more recently-proposed systems have taken advantage of advances in technology to interconnect a number of students in the same classroom, or in different classrooms, for purposes of gathering information, or facilitating access to instructional programs. One example is U.S. Pat. No. 4,636,174, which enables students to download instructional programs from a central computer, which acts as a sort of file server. In this system, the student, rather than the teacher, has control over system access and operation.

Another example is U.S. Pat. No. 4,759,717, which discloses detailed networking structure for connecting conventional personal computers. However, there is at most only limited teacher-student interaction contemplated. Rather, this system is directed more toward providing, at a central location, an instructional program which may be downloaded locally so that students can learn various types of computer programs.

Yet another example of a conventional student response system is U.S. Pat. No. 4,764,120. This system is intended to collect data of a limited nature (e.g. responses to multiple-choice questions) from a number of classrooms. There is no provision of statistical analysis to inform the teacher of how well a class is learning the concepts being conveyed. This feature also is absent from the other two just-mentioned U.S. patents.

One of the important services an electronically-based classroom teaching system can provide is to enable a teacher to monitor progress of the class and of individual students, and to focus effort in areas where students seem to have the most trouble understanding the concepts being taught. A electronic classroom teaching aid also should assist a teacher in breaking through the reluctance that students have to participating actively in class. Some of this reluctance derives from basic shyness, or fear of seeming different, or fear of seeming superior (or less intelligent, for that matter). Enabling students to respond individually and confidentially by electronic means to questions posed by the teacher can help to break through some of the shyness or reluctance a student otherwise may exhibit.

However, this confidentiality by itself does not suffice to satisfy all students, at all levels, in all teaching situations. Sometimes active participation and motivation can be encouraged better by combining students in small teams (by twos or threes) and requiring that they respond to questions as a team. In this way, students can learn from the insights and difficulties of their peers. The teacher can infer class progress from the responses of the teams.

In still other situations it is important to enable students to proceed, if possible, in a self-paced manner, to learn concepts conveyed in the classroom, while still having the teacher present to monitor the situation and to concentrate in areas where the class seems to be having difficulty. Here, it is important that the interactive electronic classroom system advise the teacher, as soon as possible, what percentage of the class grasps the concepts being taught.

Certain of the above-mentioned U.S. patents, such as U.S. Pat. No. 4,004,354, describe systems which provide the teacher with a readout of the percentage of students answering a question correctly. However, the types of questions still are limited to multiple choice, and do not provide a vehicle for further discussion and exploration of concepts which appear to be difficult to grasp.

It would be desirable to have a system in which students could respond to a wider range of questions, with different types of responses required (for example, a narrative response of limited length). It also would be desirable to enable a student to take a quiz at his or her own pace, with questions requiring answers other than multiple choice or simple numerical answers. Further, it is desirable for students to be able to run short didactic programs which are designed to enable students to experiment immediately and actively with the concepts which are being taught in that class, and which simultaneously give feedback to the teacher. Those students who have succeeded in a task may be assigned more advanced work while others may receive remedial instruction. It follows that different portions of a class should be able to work at one time, on different tasks, under control and supervision of the teacher. Such a system would be in complete contrast to conventional computer-based instruction which has tended to have the effect of replacing, rather than assisting teachers.

In summary, it is desirable to have a system which simply enables a teacher to teach better by encouraging active learning in the classroom, by providing rapid feedback on students' understanding, and which simultaneously relieves a teacher of certain burdens in routine paperwork that otherwise would have to be assumed, and which otherwise would take important time away from the teacher. It further would be desirable for such a system to be combinable with various electronic devices (such as video or educational resource materials stored on optical discs) to provide information to students through additional media which again do not replace a teacher; but rather which augment what a teacher can offer alone.

SUMMARY OF THE INVENTION

In view of the foregoing, it is an object of the present invention to provide a computer-based, networked electronic classroom system in which the teacher can monitor class progress, ask questions including those requiring narrative or other more complicated responses, and generally focus efforts in areas where more instruction appears to be needed.

It also is an object of the invention to provide classroom facilities for students to perform computer based instructional exercises, run didactic software and simulations, and compete as groups in games or other computer based instructional activities under the close direction and supervision of the teacher, while retaining the benefits of individual feedback associated with single user stand-alone systems.

It is another object of the invention to provide facilities for fully or partially automating the giving and grading of quizzes, class attendance rollkeeping, grading of homework, and other routine paperwork associated with monitoring student progress and recordkeeping.

To accomplish these and other goals, the novel, inventive electronic classroom herein described includes a central computer and display at the teacher's desk, a plurality of terminals at desks of individual students, and network connection between the central computer and the terminals. The terminals may range in complexity from a simple dedicated keypad with rudimentary display, to a hybrid version of a calculator/terminal with numeric and function keys, to a rudimentary handheld computer with a full keyboard and single or multiline display, having a number of other possible functions such as those of calculator, typewriter, organizer, appointment diary, phone directory, thesaurus, and dictionary, up to a full-fledged personal computer capable of operating in a stand-alone mode. The student terminals may be fixed in the classroom, or may be carried by students as portable devices with numerous possible ranges of applications outside a classroom context.

Thus, the inventive system encompasses a range of possible hardware and software embodiments, enabling a range of cost and functionality in its possible implementations. This range also is evident for permissible connections between the central computer and the student terminals.

The network connection between the central computer and student terminals may consist of a full local area network (LAN), enabling equal connectivity among all stations and any industry accepted physical topology, or (in the preferred embodiment) may consist of one of many possible lower cost network options with unequal connectivity where a special higher level protocol ensures that all messages from student terminals pass through the central computer or through a special network server connected directly to it.

Another component of the inventive system is an electronic display for displaying textual and graphic information for instructional purposes by a teacher to a class. As with other components, this display may take several forms. It may be a liquid crystal display which lies on top of an overhead projector and is driven by the display output from the central computer; it may be a projection video device which also is driven by a display output from the central computer: it may consist of either of the preceding physical display devices driven by a special graphics computer using display commands from the central computer in a language such as the "Display Postscript" (tm); language if student terminals have sufficiently powerful displays, these may be used as the necessary display by sending the information to be displayed down the network from the central computer to the student terminals.

The information to be displayed may be divided into two categories. The first category consists of any instructional material, such as normally is displayed by teachers in conventional classrooms, and includes questions, directions, or activities. The second category includes student responses and statistical or graphic analyses (or other orderings, sortings or summaries) of the same. The display of all such information in both categories is under control of the teacher, who may view selectively such information privately on the central computer monitor before sending it out for viewing by the students.

The inventive system also involves a combination of software and hardware to accomplish the following:

a communication protocol, associated with the central computer, the network, and the plurality of student terminals, for allowing the transmission of command data from the central computer to one or more of the student terminals (selectively or collectively), for allowing the downloading of programs from the central computer to one or more of the student terminals in similar fashion, and for allowing the transmission of student responses or other data from the student terminals to the central computer;

a timing environment, associated with the central computer software, the student terminals, and software operating on both the central computer and the student terminals, for allowing each of the terminals to proceed through a sequence of student tasks (those tasks consisting of one or a combination of questions, quizzes, tests, classroom exercises, didactic programs, instructional games, simulations, homework, and other instructional activities) either at each student's own pace, or in lockstep with all other students in the class. If the teacher assigns different tasks to different groups of students in the class, then students within each group may proceed either individually or in lockstep with others in that group, at the selection of the teacher. In all cases the responses would be transmitted and monitored by the central computer, with the teacher retaining control of the pacing of student tasks via the central computer;

a command language, with an optional associated menu driven command language generator, for enabling an instructor to prepare a series of student tasks (as described above) prior to a classroom session, and for storing this information for subsequent retrieval and use, for example using non-volatile memory or removable media such as floppy discs;

a control program, optionally utilizing menu driven facilities, for enabling a teacher during a class to enter a new student task, or to retrieve and view previously prepared student tasks which then may be executed;

a log-on facility for students to identify themselves personally, and by classroom location, to the system;

a database facility for storing information input to the system. This information may be input by the teacher directly via the central computer, by the students via student terminals, by reading from removable storage media (such as floppy disks) or by other means (such as networking between a teacher's private computer and the electronic classroom system). The types of information which might be stored in the database would include class records, student rolls, questions, tests, or other tasks asked during each class, and student responses transmitted to the central computer. The actual repository may be fixed media within the central computer of the electronic classroom system, or it may be removable storage media which may be transferred between the classroom system and another computer outside the classroom (possibly the teacher's private computer). This transferral also may take place via a local area network between the central computer and other computers;

presentation and analysis facilities to enable a teacher to view and analyze information gathered by the system. During a classroom session, these facilities would allow a teacher to view and analyze student data and responses. They also would permit the teacher selectively to show certain of these responses and analyses of such responses to the class via the electronic display. Outside a classroom session, probably on a separate computer (possibly, one located in a teacher's office), these facilities would allow a teacher to examine student responses further for a variety of purposes. Such purposes might include a search for weaknesses, or strengths, in areas of understanding for individual students, or for the class as a whole. They might include the tracking of progress of individual students, or the grouping of students with particular weaknesses or strengths. They may include assessments of attendance, class performance, homework performance, or the assignment of grades, possibly with automatic facilities for grading the various components of student performance to a selectable curve. They also may include facilities for directly transmitting student grades to administrative databases via a network.

The range of overall contexts in which the present invention may be installed and used is almost unlimited. However, emphasis on particular features of the system may vary from one context to another. For example, at the primary level there is likely to be more emphasis on the additional variety in activities provided by the system and its capability for instructional feedback to students and teacher. In addition to these factors, at the high school level automatic testing and record keeping become more important, since one teacher teaches many more students. Also, the diagnostic and early warning features become more significant. At the college level, with huge classes, all these features are important, and a professor is likely to have his or her own computer outside the classroom to assist with the preparation of materials and with data management.

BRIEF DESCRIPTION OF THE DRAWINGS

The foregoing and other features and objects of the present invention will be described in detail herein with reference to the accompanying drawings, in which.

DETAILED DESCRIPTION OF A PREFERRED EMBODIMENT

Figure 1:
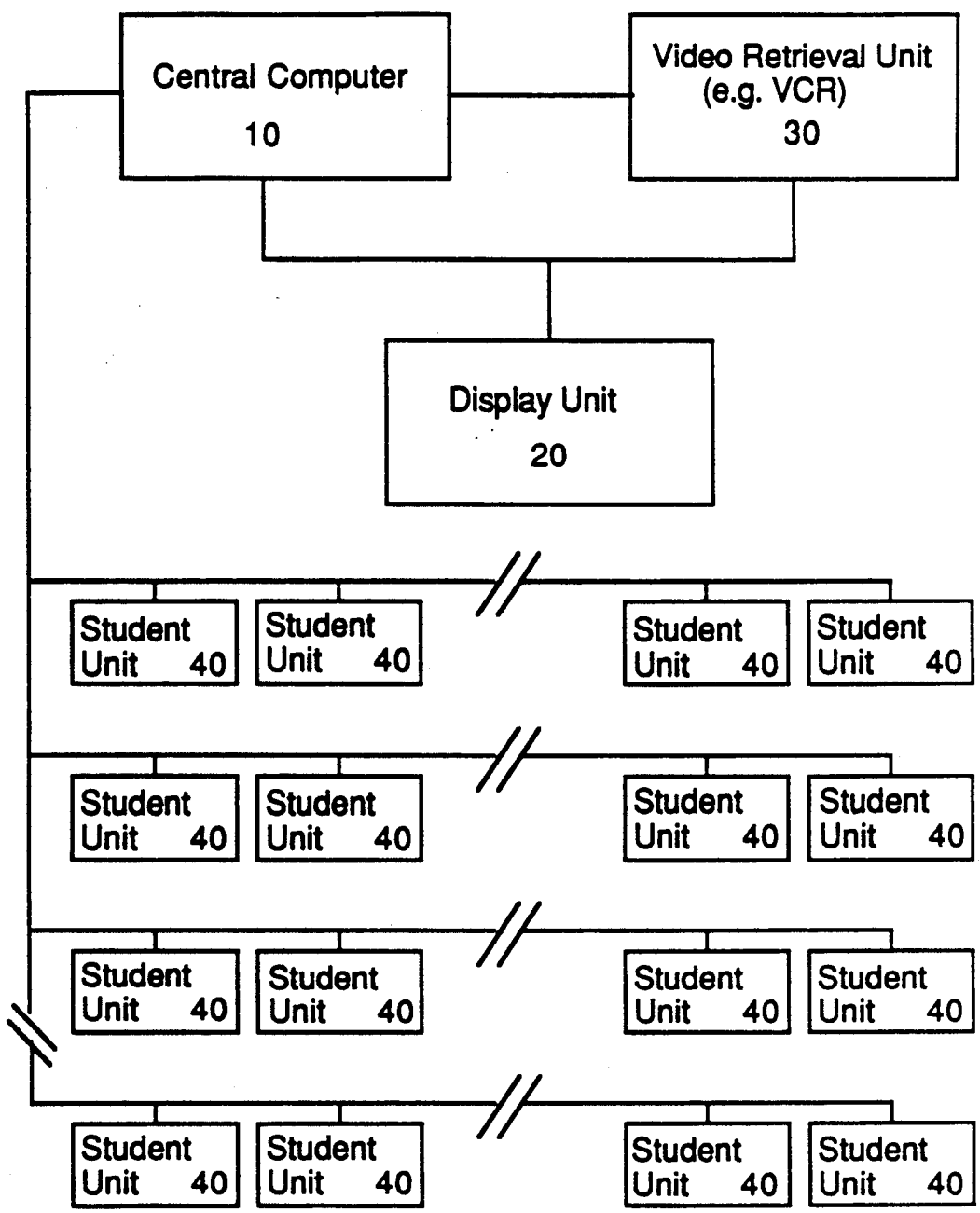
FIG. 1 is a simple block diagram showing basic components according to one embodiment of the present invention.

Referring to FIG. 1, the inventive system herein described includes a central computer 10 which is capable of acting as a host for teacher interaction with the system. This computer, which also acts as coordinator for the entire system, would be used by the teacher to administer lessons and programs for different classroom sessions, as will be described below. Such a machine might be an IBM PC-XT (tm) computer or PC-AT, or an XT- or AT-compatible machine; an IBM-compatible machine employing one of the Intel 80386 family of microprocessors an Apple MacIntosh (tm) computer or other similarly capable computer; an IBM PS/2 (tm) computer, such as a Model 70 or Model 80 (tm) computer or other computer employing the IBM Microchannel (tm) architecture; a Sun, Apollo or Digital Equipment Corporation (DEC) computer or workstation; a NeXT computer; or any other computer capable of performing this function. Notwithstanding the foregoing list of suitable hardware, the invention is not to be considered as limited to specifically listed items.

The operation of the present invention is not dependent on the type of operating system under which the computers employed run. Thus, the MS-DOS (tm) operating system, PC-DOS the (tm) operating system, Apple's operating system, any of the UNIX (tm) family of operating systems, the OS/2 (tm) operating system, or any other general-purpose operating system supported by the processor employed in the central computer 10 may be used. The range of computers enumerated above should be considered to be expanded as appropriate to encompass all those which are compatible with or otherwise run under one or more of these listed operating systems.

The computer should include whatever storage peripheral(s) (such as a floppy disk drive, a hard disk drive, or an optical drive such as a write-once read-many (WORM) type drive) is (are) necessary to enable the computer to run its programs; to store and access necessary information; and to store results for subsequent access by the teacher. The speed, storage, and display capabilities of the central computer 10 ideally should be matched to the classroom in which the computer is installed. For example, an IBM-XT (tm) compatible computer with a ten-inch screen may be adequate for most applications in a class of thirty students, while a class of three hundred students would benefit greatly from a Sun model (tm) workstation with a 19-inch monitor.

In one embodiment under development by the present inventors, an AT-compatible machine is being used, with one floppy disk drive, a 20 MB hard disk drive, and an IBM Monochrome monitor driven by a "Hercules" compatible graphics card. Other graphic display formats are available and may be used, such as those employing a color graphics adaptor (CGA). enhanced graphics adaptor (EGA). or video graphics adaptor (VGA).

The system also includes an electronic projection display 20, for example an overhead projector with a liquid crystal display (LCD). The electronic projection display 20 may be driven by an IBM compatible CGA unit inside the central computer. Depending on the degree of resolution desired, other types of adaptors, such as EGA. VGA or Hercules, also may be used (subject to the capability of the operating system and hardware to accept two displays of different formats). Also, monochrome displays, providing gray scale formatting of color shadings, may be used. By connecting the display 20 with the computer 10, displays created by programs run by the computer 10 may be shown to the class. The projection display also may allow the teacher to display handwritten information for discussion by the class, in lieu of a chalkboard. The display 20 also may be used in association with a video retrieval system, such as a videocassette recorder (VCR) or videodisk player (VDP) 30, which may be used to show videos (possibly under computer control) to the class.

In another embodiment, an Apple MacIntosh II (tm) computer is used, with an internal hard disk drive and a color monitor for the teacher's display. The projection display is driven by a second standard display interface.

Another structural element of the present invention is the necessary connection between the central computer and student terminals. The International Standards Organization Open Systems Interconnection Model (ISO 7498-1984) describes the communication process as a hierarchy of seven layers, each dependent on the layer directly beneath it and with each layer possessing defined interfaces with the layers immediately above and below. These seven layers are 1. Physical, 2. Data Link, 3. Network, 4. Transport, 5. Session, 6. Presentation, and 7. Application. It is not contemplated that the invention, in its preferred embodiment or otherwise, would require any particular implementation of any layer or any particular interface between layers. Rather, the networking process may be defined by the functional requirements of the system.

For example, the Physical Layer in the ISO document just mentioned refers to the physical connections between the computer and the network, including the mechanical aspects of the connection (cables or connectors) and the electrical aspects (voltage, current levels, and the techniques used to modulate the signal). This layer also defines the network topology. Thus, for this invention, this level may comprise connections which may be accomplished, for example, by a twisted pair wire, by coaxial cable, by optical fiber, or by electromagnetic transmissions, including but not limited to infra-red and radio, through the air. The functional requirements for operation of the system relate to sufficient speed of data transmission, which in turn depends on the number of student terminals attached to the system, the complexity of the student tasks (instructional activities), and the division and allocation of necessary data processing between the central computer and student terminals.

Another functional requirement is the need for a robust and durable installation which does not affect or alter the normal classroom environment unduly. Also, if students own their terminals, then adequate provision must be made for convenient locations for them to connect and remove their terminals to or from the network (unless connection is accomplished directly by infra-red transmission). Power delivery also may be included in the system.

The Data Link layer defines the protocol that computers must follow to access the network for transmitting and receiving messages. These messages are sent onto the network as specially formatted discrete frames of information rather than being continuously broadcast. For example, three of the standard packet formats used for digital communications are the non-LAN asynchronous byte, as used by terminals and modems (RS-232), the SDLC frame (used by Appletalk (tm) networks, among others), and the Ethernet Frame. The Network level defines how packets—communications composed of a defined format of data—are routed and relayed between computers on the network. Higher levels of the networking process essentially define protocols for communication between the levels themselves.

This invention does not require any particular implementation of the Data Link and Network levels, or of higher level protocols, again because these are not considered part of the inventive concept per se. Suitable implementations will be known to ordinarily skilled artisans, and need not be described here in detail.

Rather, networking requirements may be expressed in functional terms for a particular embodiment of this invention. For example, for a class of thirty to one hundred students, with student terminals possessing 64 kilobytes of random access memory (RAM), the network and communication protocols might reasonably enable the following:

Reprogramming of Student Terminals the central computer would be able to reprogram all student terminals (or a specified group of terminals) with the same program of length up to 64 kilobytes in a time not exceeding 15 seconds, a message from the central computer to all student terminals (or to a specified group of terminals) to run an already resident program would take no longer than one-half second, the central computer would be able to reprogram a single specific student terminal, and two or more groups of student terminals would be separately accessible by the central computer. Each of these groups would be able to be reprogrammed and "run" with no noticeable interference on the processes of other terminals.

Data Collection by Central Computer all terminals must be able to return data to the central computer, for timing purposes, assuming for example that these data take the form of a terminal ID and 20 bytes of data, total transmission time for a class of one hundred terminals would not exceed one second, and although data transmission to the central computer from student terminals normally would be event driven and initiated by individual terminals, the protocol also should contain a facility for the central computer to be able to issue a "stop and transmit" message. This "stop and transmit" message also would be applicable to a group of student terminals. Other terminals would not be noticeably affected in their local activities during this operation.

Data Transmission between Terminals

To provide the capability for students to compete with each other in games, data transmission between individual student terminals would be possible. In a scenario with each terminal communicating with each other every 5 seconds and sending a packet which includes one byte of data, communication time preferably would not exceed 2 seconds for any terminal.

It is to be emphasized that the transmission times and data block sizes given here, are for illustrative purposes only. If student terminals were more powerful, or had larger memories, or if higher cost were acceptable in a particular application, then lower transmission times or larger data blocks may be specified, but the functional capabilities of the protocol would not necessarily vary.

Another feature of the present invention, as alluded to above, is the type of student terminal 40 to be used. A simple keypad may be used, enabling the provision of numerical or multiple choice responses. However, since prices of more and more sophisticated computer systems are decreasing almost daily, it is not unreasonable to expect that all students will have available to them more sophisticated computers, ranging from a machine such as a Sharp PC 5000 (tm) portable computer, for example, with a simple display; to an electronic typewriter with an RS-232 interface, which also has a simple display of perhaps a few lines; to an IBM PC (tm) or PC-compatible machine or Apple-type computer. All such computers would be connected through an internal or external network adaptor (possibly incorporating an RS232 interface) to the network wiring to the central computer, which may include a special network processor for increased speed.

In the presently preferred embodiment, students would have a keyboard system which is sufficiently sophisticated to enable them to respond in narrative fashion to questions posed to an entire class, the teacher then being able to receive the responses individually as they are stored by the system at the central computer 10. The teacher then could select certain responses to provoke classroom discussion, or alternatively could save the responses for later grading. Other advanced types of analyses of student responses also are possible, and will be discussed later. Also, the system should be sufficiently sophisticated to permit the students to take a quiz which is fed from the central computer 10 to the individual computers 40, so that students may work at their own pace through the quiz, or through the material which is to be covered during that session.

In a mode of operation in which students react and answer questions posed by the teacher during the session, the students can respond confidentially through their individual terminals, so that other students do not have to see each other's answers. This confidentiality is useful not only for enabling students to take quizzes via the computer network system, but also for allowing students freedom to respond without worrying about what their peers will think of their answers during class. Alternatively, on some occasions where grading is not of primary consideration, students may be asked to combine (through a special log-on procedure) with their neighbors in groups of two or three, and to discuss answers with these neighbors before responding as a team. In this way, students can learn from the insights and difficulties of their peers, and benefit from the structured nature of the interaction provided by this system.

For most types of questions, the central computer 10 can provide the teacher with a histogram or other readout indicating the percentage of students who answer questions correctly. The readout also may be shown to students via the overhead display. If a relatively low percentage of students (as determined by the teacher) seem to be understanding the concept being taught, the teacher may choose to spend additional time on that concept, or may choose to assign additional work to students, or may take other remedial action. Otherwise, classroom flow may proceed as usual.

Figure 2A:
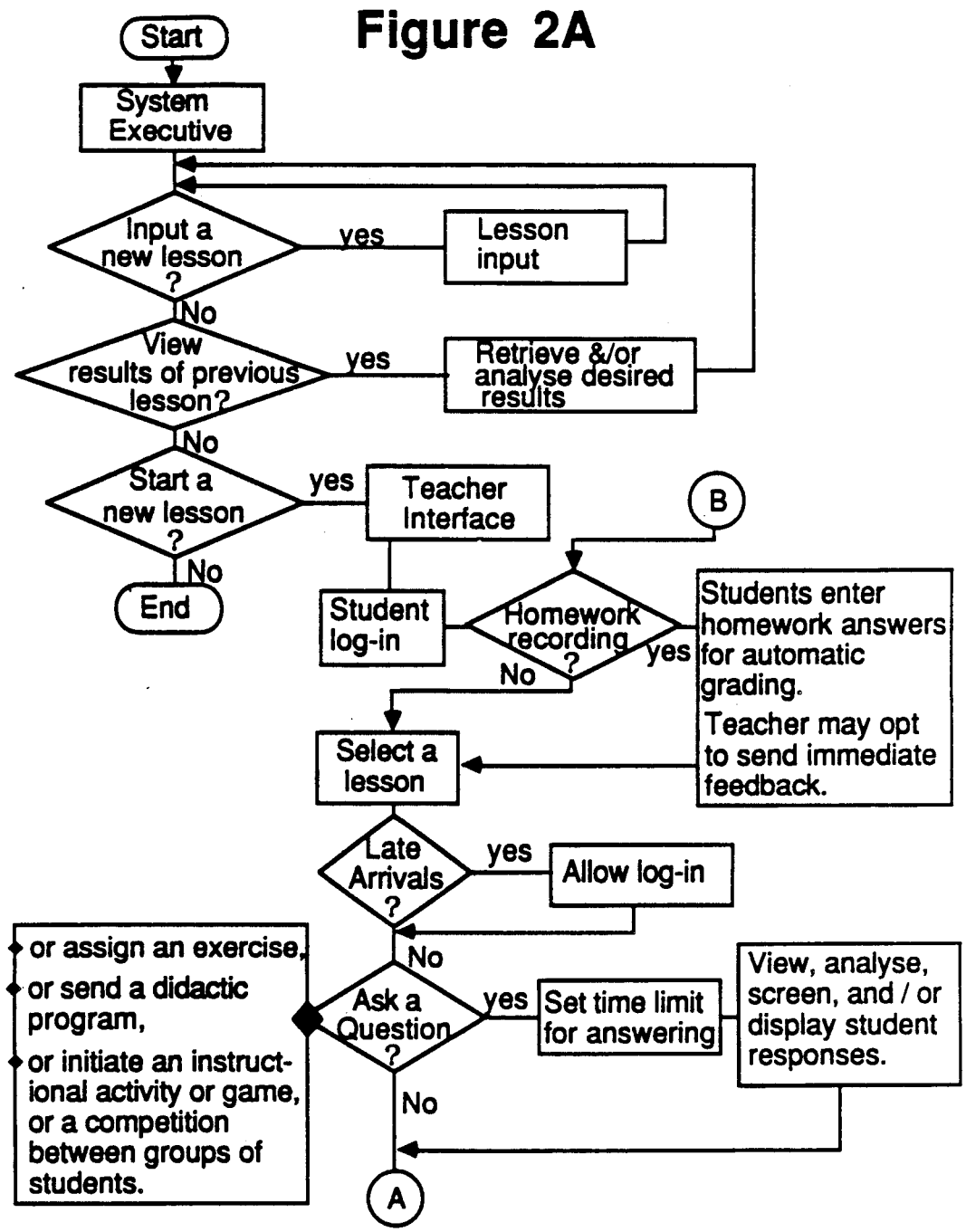
FIGS. 2A-2B are flow charts describing a simple procedurally driven implementation sequence of operation of certain of the features of the present invention, and possible sequences of events in classroom sessions.
Figure 2A:
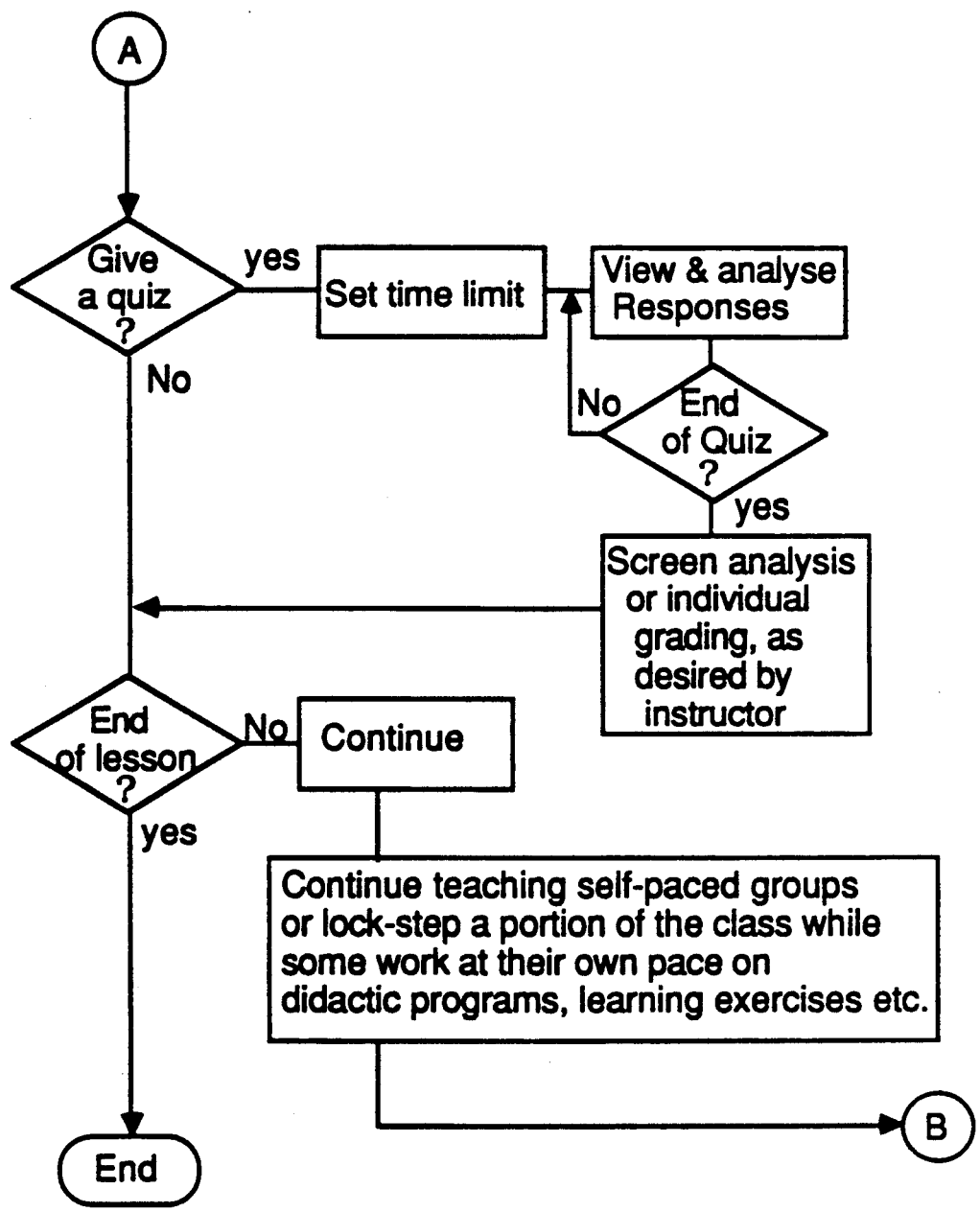
Figure 2B:
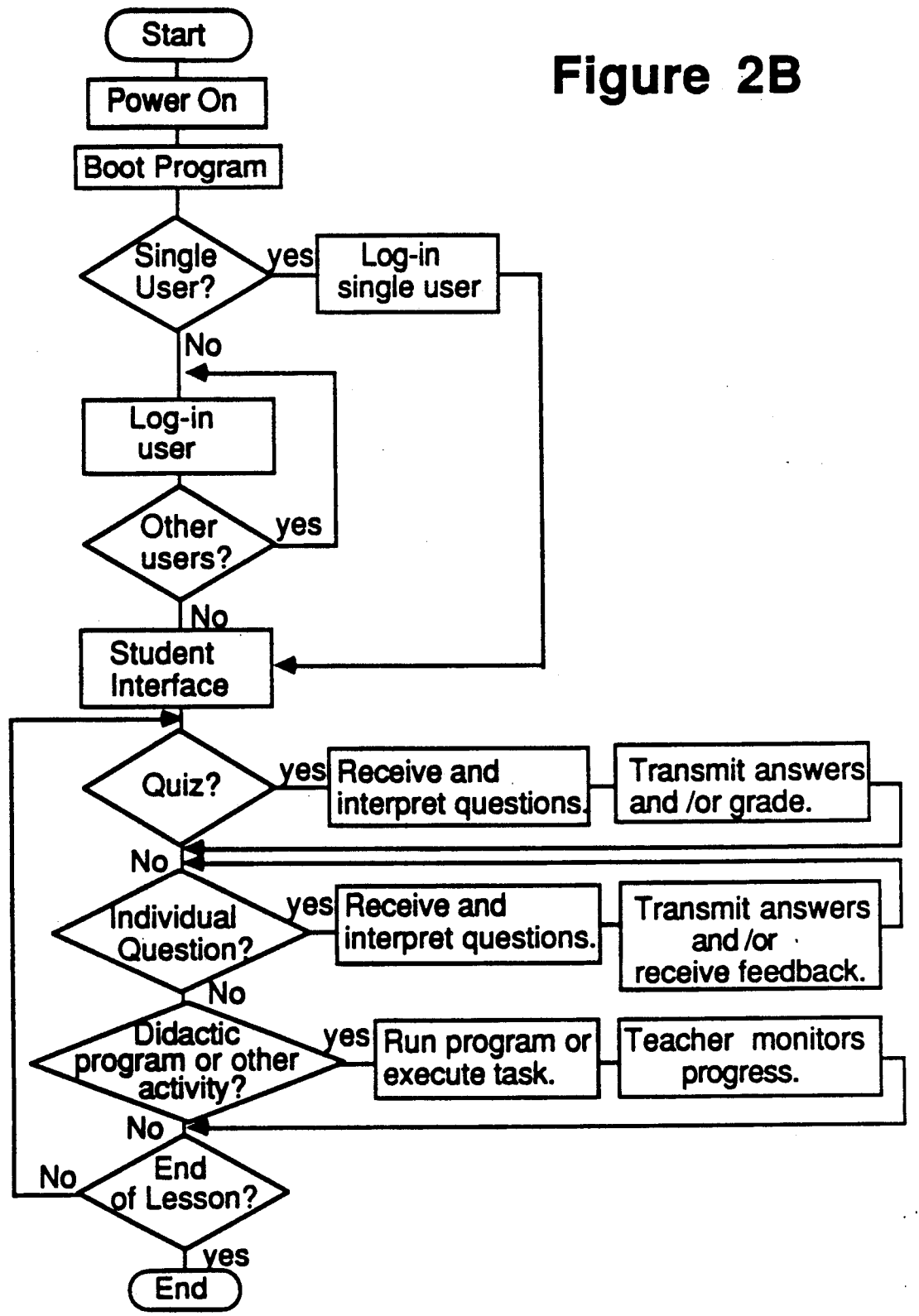

One example of procedurally driven software necessary to operate the inventive interactive classroom system contains the following elements, as shown in FIGS. 2A and 2B. First, in FIG. 2A, a system executive program acts as a controlling routine, which may call a number of other subroutines, and otherwise controls flow of data through the network. The system executive program provides program flow, in accordance with which a teacher may: input new lessons: retrieve data from previous classroom sessions; or set up the system for the current day's session.

Second, there is a teacher interface program which: permits students to log on to the system at the beginning of the class (thus automating the roll-taking function, showing the classroom locations of students by name, and even allowing late arrivals to log on); permits a teacher to ask individual questions during class (to which students may respond) in various formats, including multiple choice, numeric answer, matrix grid, ordering, quiz set, single word answer, or narrative format: permits a teacher to give quizzes which students may answer at their own pace, within time limits, with answers in any of the just-mentioned formats; may automatically grade homework answers entered by students; enables viewing of student answers individually and collectively; enables viewing of a statistical analysis of student answers in a variety of forms (including various graphical and histogram representations, of which examples will be given later), with an option of showing the results to the class; and enables maintenance of a database of asked questions and student responses.

The system also can be used in other ways with didactic software and simulations which are similar in many respects to some types now used for teaching on stand-alone personal computers or mainframe systems such as Plato(tm). The principal difference is that, in the system described herein, software now may be designed to be used in small segments, for active learning under control of the teacher, in class. For example, suppose that a science teacher was teaching about "Heat" and wanted to illustrate the concept of heat flow along a metal rod. The teacher then might send a program down to student terminals which would simulate a rod with a heat source at one end and which would allow students to experiment in class to see the effects on rod temperature over time, of different heat sources, different rod thicknesses, and different metal conductivities.

Used in this way, didactic software and simulations retain their benefits (such as individual feedback), but have several additional advantages over their use in stand-alone personal computers: they promote active learning in the classroom; they are easier and cheaper to write because they may be short and simple; the teacher knows that the whole class has used a particular piece of software for a particular time; if they are short and simple, they are easier for the teacher to review prior to use; and finally, their use may be integrated closely with the teacher's own individual presentation of the curriculum. Also, the teacher may monitor progress of particular students or the progress of the class as a whole in a statistical sense during the exercise.

Many of the same advantages apply if the system is used for the delivery of didactic programs, simulations, or question sets for homework. This application requires that student terminals be portable and possess non-volatile memory for storing such programs sent down the network. The students then may carry their terminals home with them, and their work can be reviewed by the teacher and/or automatically graded during the next class. An alternate scheme, if student terminals are not portable, is that they be provided with removable media such as floppy discs which can be removed by students and used with their systems at home.

The system also may be used for grading homework automatically even on terminals that do not possess either of the above features. Here students are given assignments in the regular way and type in the answers when directed to, at a later class. The teacher may direct the system to compare these with stored correct answers and print or display grades, and/or may review them individually.

Another possible group of instructional activities for which the system may be used is games or competitions. The primary purpose of such activities is to increase student interest and involvement, and ultimately, student motivation. Students may compete against each other or may be divided in teams to answer questions, or conduct any other activity which can be scored. Scores and ongoing play sequences can be displayed to the class during and after the activity. The variety of types of games which can be implemented on the system is virtually unlimited, and includes many types in which scoring is neither necessary nor desirable.

As has been noted, the system supports but does not require that all students proceed in lockstep with each other through an activity. It also is possible for students to conduct completely separate activities, or to be grouped together by the teacher for particular activities. For example, suppose that a teacher had taught a concept and had asked questions using the system to assess how well students had understood the material. Those students that answered the questions correctly could be sent a didactic program or could be assigned work from textbooks or any other in-class activity, while the remainder of the students who had not understood the concept could be grouped electronically by the teacher to receive more instruction from the teacher in activities whereby the system would address this group separately. The teacher also would retain the capability to monitor the activity of the other group (if they were involved in an activity using the system).

Other teaching functions, not specifically enumerated herein, are within the ken of the ordinarily skilled artisan, and accordingly are within the contemplation of the present invention. Thus, the foregoing enumeration is to be considered exemplary, and not limiting.

With respect to the question asking function, it is envisaged that individual students would be able to proceed at their own pace through a series of questions, should the teacher decide to give a quiz. Alternatively, should the teacher decide to ask individual questions throughout the class, students would answer those questions within a given time limit. The results would be analyzed, compiled statistically, and assembled for the teacher's review, and for optional display to the class. In this respect, "analysis" may include the option of natural language processing for narrative answers via a natural language interpreter.

Thus, for example, a teacher who asks an open-ended question such as "What is truth?" may scan the students' answers for the percentage of students who invoked the concept of a deity in their answers, or those that answered with a negation. Many other types of analysis are possible, including those based on artificial intelligence (AI) concepts. Because the system may be implemented in an open ended fashion, such advanced applications may be provided by third party software developers.

Another aspect of the necessary software is a boot program, shown in FIG. 2B. which may be resident in the read only memory (ROM) or other non-volatile storage of each student's computer 40. When the student turns the computer on, the boot program is run, connecting the student to the central computer 10, so that the student then can log on. The log on sequence may be one in which several students may share a computer. A file of all student names is maintained by the central computer for each class. As with any commonly used log on procedure, a password may be employed such as (for example) the last four digits of the student's social security number. The boot program may be overridden by the teacher interface program, if a student arrives too late (e.g. ten minutes late). so that log on of excessively tardy students would not be permitted, the teacher interface program optionally recording the student as absent that day.

Another aspect of the necessary software is the student interface program, also shown in FIG. 2B. which operates the student computer, and acts as the principal interface between the teacher's computer and the student's computer. Other functions of the student interface program would include: enabling teachers to ask questions over the network to determine a student's understanding of a given lesson; returning student responses to enable teachers to monitor a student's progress through a series of questions (as for example, in a quiz): accepting and interpreting question and exercise programs which are downloaded to a student computer from a teacher's computer; and sending a message to the teacher's computer when the student has completed a current task.

Also, when a student provides a response to a classroom question, the program could provide immediate feedback regarding the correctness of the response. The student's first response might be recorded for statistical purposes, but the student then may have additional opportunities within the time remaining to figure out the correct answer.

Another aspect of the invention resides in having an appropriate computer language (and/or menu driven facility) enabling a teacher to specify and activate system capabilities easily in lesson materials which are prepared prior to class. Using this facility, a teacher may prepare his or her own questions for use during class. Alternatively, he or she may compose a lesson from materials previously produced by others. The system also should allow a teacher to respond dynamically to situations in class by accessing files (or a data bank) of previously prepared materials, or creating a question (in one of the above-mentioned standard forms) on the fly. One example of such a language is referred to as a question and exercise language (QEL), which may have an interface written in a high-level programming language, such as Basic, Pascal, or C. This QEL includes a set of syntactical rules and constructs which permits a teacher to write questions to ask the class or to set exercises or problems for the class to perform.

The QEL may be sufficiently sophisticated to enable narrative questions and narrative responses, or alternatively may be simple enough to enable asking of multiple choice questions, and receipt of responses from the students. The precise nature of the constructs is not important to the invention; what is important is that the teacher be able to communicate questions to the class simply, and to receive responses in a suitable manner. Another more advanced use for a QEL, requiring an additional set of constructs, is for third-party software developers who may write course-specific software for such systems. A QEL is one way to provide a standard interface with system software for such developers.

An example of a syntax for one QEL currently contemplated which illustrates the non-course-specific functional capabilities for system software components is as follows. Here it is assumed that the device which students are using is a simple computer, such as the PC 5000 (tm) portable computer by Sharp or a similar machine manufactured by Casio, which has limited display capability, limited memory, and a slow processor. As programmed into the teacher's computer 10, the format of a question may be @Q: question type, code where "@" is a prompt to the language interpreter by the teacher to specify the beginning of a command, in the case for the entry of a question; "question type" may be multiple choice (MC), numeric answer (NUM), sequence ordering (SEQ), selection of grid coordinates (GRID), one word answer (WORD), or essay/narrative (ESN); and "code" is multiple characters (for example, up to four) used to number or otherwise identify the question.

Then, the computer may await inputting of the question, which might practically be limited to 20 lines (or whatever the capacity of the projection display is).

The format of an answer would be

@A: correct answer, time where "correct answer" gives the correct answer to the question, depending on the type of question asked. For example, for MC questions, one or more of A, B, C, D, and E (e.g., A, ABC, BCE), may be the correct answer; for NUM questions, "correct answer" may be acceptable maximum and minimum values, yielding a range of correct answers for interpretation by the teacher; for SEQ questions, "correct answer" may be a string of integer numbers; for "GRID" questions, the answer would be two sets of digits, separated by a period, indicating horizontal and vertical positions, respectively, on the grid (e.g., 3.5 would be the fifth column in the third row); for ESN questions, "correct answer" may be a wild card, or may be narrative in form, with synonyms for words used being accepted by the program as part of a correct response; and "time" is a time limit set by the teacher for the class to provide a response to the question asked, the projection display counting down the time remaining while the question is pending.

One option for ESN types of questions would enable a teacher to review responses of individual students, and to display a selected response to provoke classroom discussion. The identity of the student providing the answer need not be disclosed, so that anonymity can be preserved. Alternatively, the teacher may display what is considered the "most correct" answer, classroom discussion then proceeding from student reactions to that answer.

For some applications, a menu driven system for creating questions and exercises is simpler than a language. This is particularly the case for teachers who are not familiar with computers. A menu driven system equivalent to the simple QEL described previously might ask, Select the type of question you wish to enter:

Multiple Choice
    Numeric Answer
    Sequence Ordering
    Grid Coordinates
    One Word Answer
    Essay/Narrative Enter your own code to identify this question: _____

Enter the text of the question in the form that you wish it to appear on the classroom projection display (20 lines max.):

_____
_____
_____

Enter the answer to the question (or HELP): _____

(HELP explains the format of the answer for this type of question.)

Enter the time limit: _____ Mins _____ Secs.

Note that it is not necessary that the text of the question itself be entered into the system. The system only needs to know the type of question and its answer, if appropriate. The question itself may be written on a blackboard or overhead projector, given in a handout, asked verbally, or communicated in any other way.

Other examples of non-course-specific functions which might be included in a QEL and associated system software would be a variety of games in which students in the class would compete against other students, or in which students would compete in groups against other groups of students, with the questions on which the games are based still being determined by the teacher.

Another type of capability for programming an unlimited variety of general types of instructional activity (which may be course specific) is also within the scope of this invention as discussed earlier with reference to third-party software. Third-party software, in the sense in which it is used here, is in contrast to the basic components and utilities of the system software for this invention, which are not course specific, and not necessarily specific to any educational level. Thus, for example, a didactic program teaching concepts of current flow and voltage drops in an electrical circuit, or a simulation of heat conduction in a metal bar, would be considered course specific third-party software. So also would a program based on AI concepts which could recognize, interpret, and categorize concepts in student responses to the question, "What is truth?" However, it is anticipated that these third-party software packages would make use of calls to system routines to enable them to function in the context of this inventive electronic classroom system. Thus, for example, system library routines which might be called by the third party programs described above would provide such functions as returning data from student terminals to the central computer via the network, and displaying these data in an appropriate format on the display at the teacher's desk. Analysis and presentation of the data in particular standard forms also may be provided by system library routines.

Calls to library routines such as in the examples given above may or may not be part of the QEL per se. For example, a QEL simply might provide a facility for a teacher to run a third-party program from the QEL. This program may have been compiled and linked previously with system library routines, and may be run simply in the system environment. On the other hand, a QEL may be designed to give teachers actual facilities for generating their own didactic software. Because teachers cannot in general be considered to be professional software engineers, this latter QEL would be designed differently from the former version.

For this type of advanced user (or perhaps a professional software developer), it is desirable to provide an enhanced capability, either within or in addition to a QEL, which will enable the system to be programmed and used in such a fashion. This capability necessitates the detailed specification of a user interface with the control and data structures of the executive program and/or other portions of the software. Subject to the limitations of this interface, the user should be able to gain access to sets of capabilities by mechanisms including (but not limited to) the following: inclusion of user directives to the operating system; inclusion of user generated computer code in various forms such as a high level language (Basic, Pascal, etc.), or compiled relocateable code, or absolutes; interface with network control programs; interface with teacher interface program; interface with student interface program.

Figure 3A:
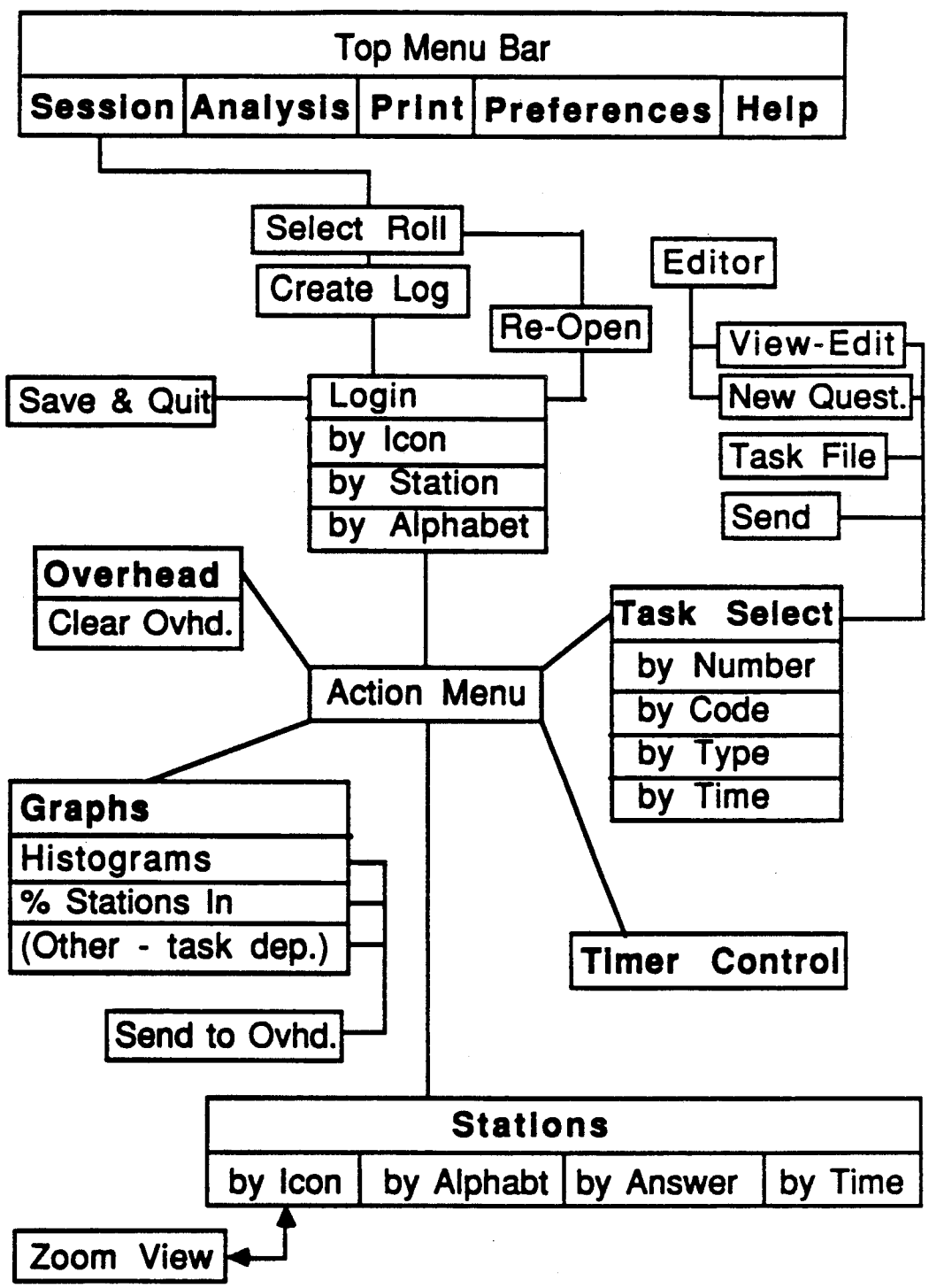
FIGS. 3A-3B are pictorial flow charts illustrating in greater detail classroom session flow in accordance with the present invention.

FIG. 3A shows classroom flow with reference to the menu bar which appears at the top of the teacher's screen. To start a session, the "Session Menu" is selected. To open a session, a roll is selected, and a log created. Students then can log in (in the example shown in FIG. 3B, this is done by icon, or marker within a set of markers corresponding to the arrangement of seats in the classroom). After an appropriate period of time, the teacher can close the roll (but can reopen it, for example, for late arrivals).

Figure 3B:
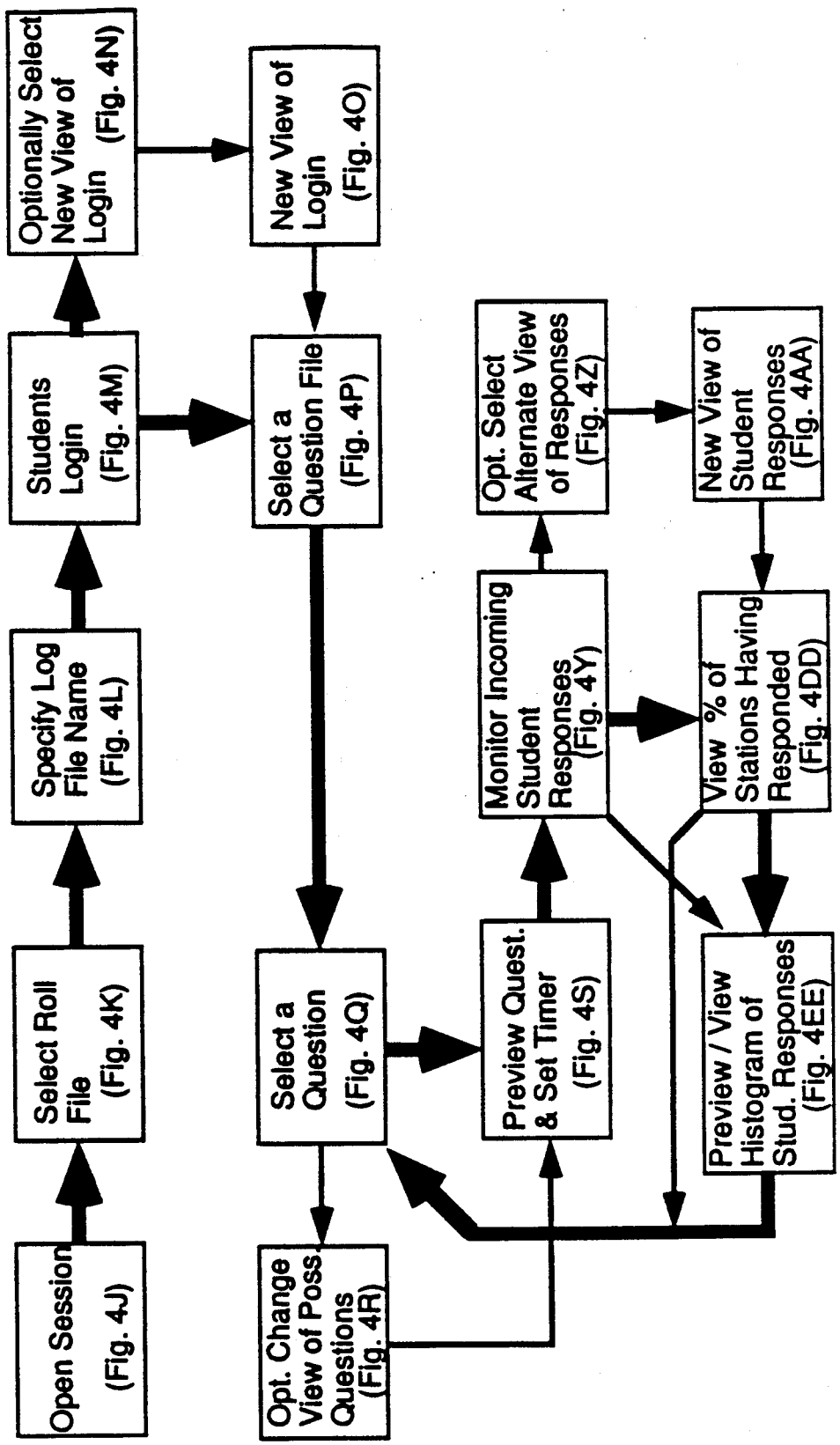

After students have logged in, the teacher can see who is sitting where, or can simply proceed to the classroom session, working from the "Action Menu". In FIG. 3B, a review file is selected, and questions are asked, to which responses of varying types may be given. These can be sent to the overhead for viewing by the students. Prior to that, the overhead display may be cleared. The time period for response may be set and monitored (and also displayed on the overhead for students). This action may be carried out in the "Timer Control" and "Overhead" blocks in FIG. 3A. Class responses may be monitored, either by icon or by student. A distribution of responses with time may be shown, or a histogram showing percentage of correct and incorrect responses. Again, all this may be shown on the overhead as well, in accordance with a selection from the "Action Menu" in FIG. 3A.

The box in the lower left-hand corner of most of the screens shown in FIG. 3B bears mentioning. This box contains a "question asked number" (0 on some screens, and 12 in others within the loop shown) which refers to the question being asked. Up and down arrows are shown next to the number, and a small white rectangle (a "scroll bar") is to the right of the up and down arrows. This rectangle is shown at the bottom of the screens, to indicate that the most recent question is being asked. By pointing a mouse at the up arrow, for example, an earlier asked question may be shown. That an earlier question is being shown would be signified on the screen by the white rectangle being positioned higher up on the screen. In FIG. 3B, the number "0" is shown on the initial screens, because no question has been asked yet. When the first question is asked that number would change to "1". The number "12" is shown in some of the screens because, in the loop shown in the lower two rows of screens, the number will change depending on the question.

The teacher's interface program was shown as a procedurally driven application in the example given in FIGS. 2A–2B. This inventive system includes the possibility of other types of interfaces. For example, this program may also be designed and implemented as an event driven windowing system with pulldown menus as contained in FIGS. 4A–4EE, or any other interface which satisfies the functional requirements.

Figure 4A:
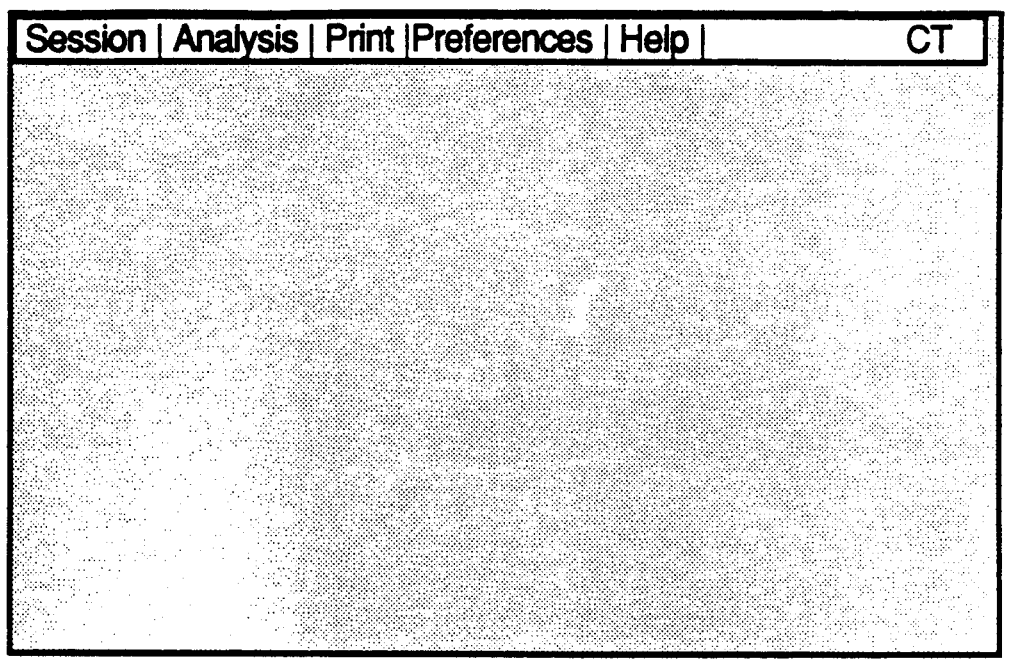
FIGS. 4A-4EE illustrate sequentially an event driven implementation of the invention by providing a series of views from the teacher's display, these Figures representing a windowing environment with pull-down menus.
Figure 4B:
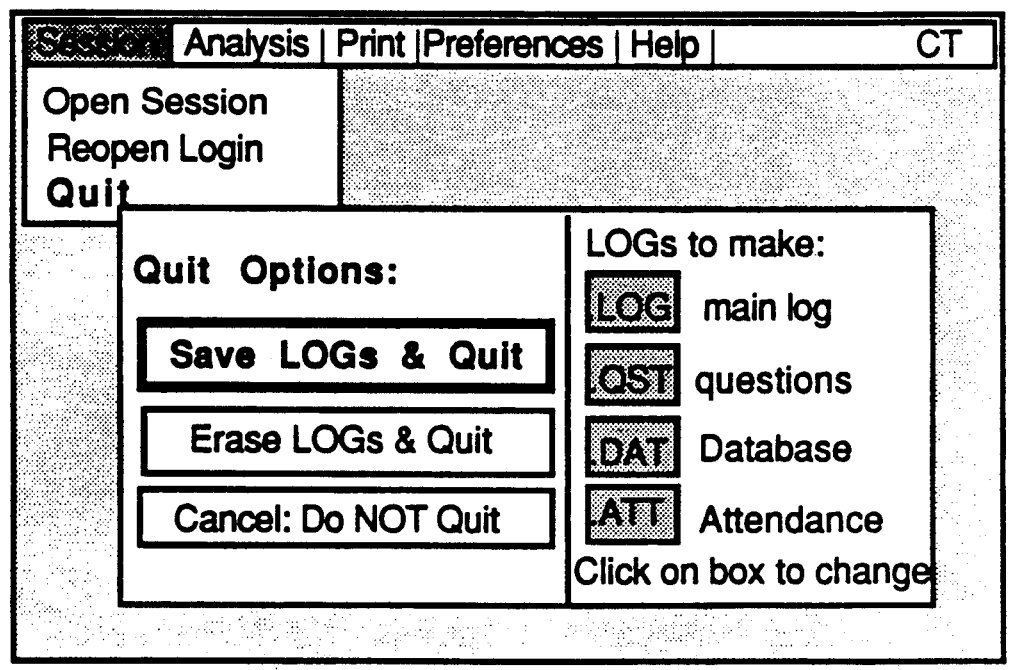
Figure 4C:
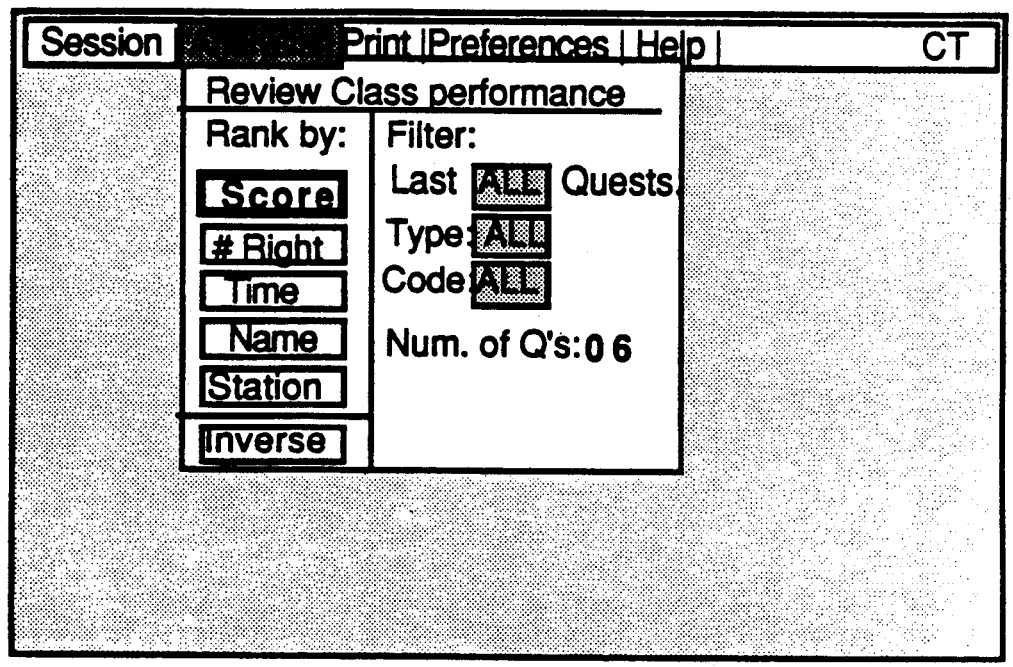
Figure 4D:
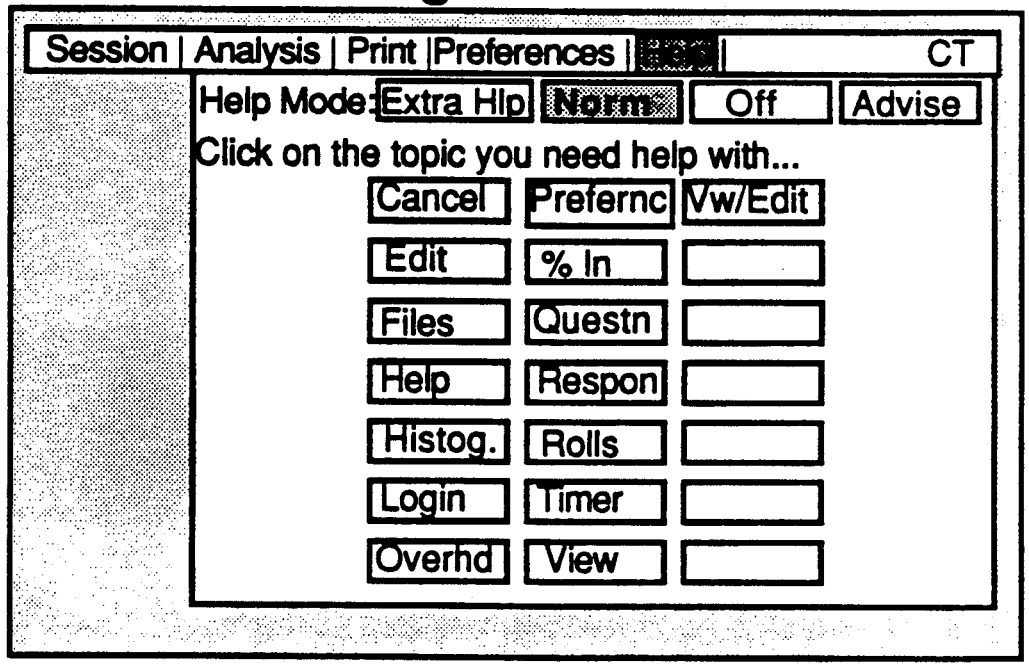
Figure 4E:
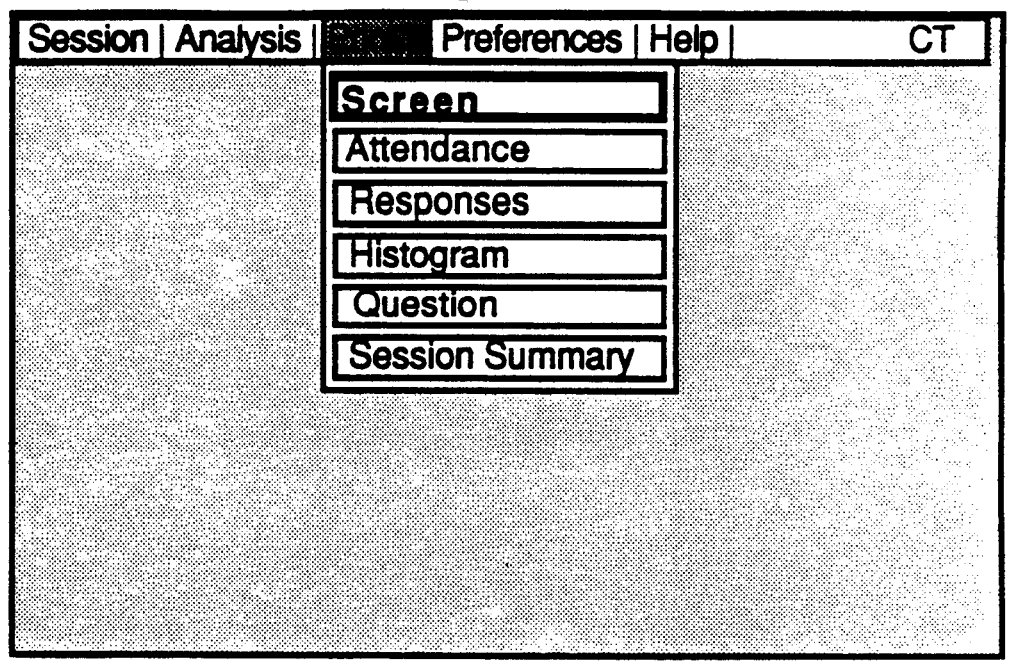
Figure 4F:
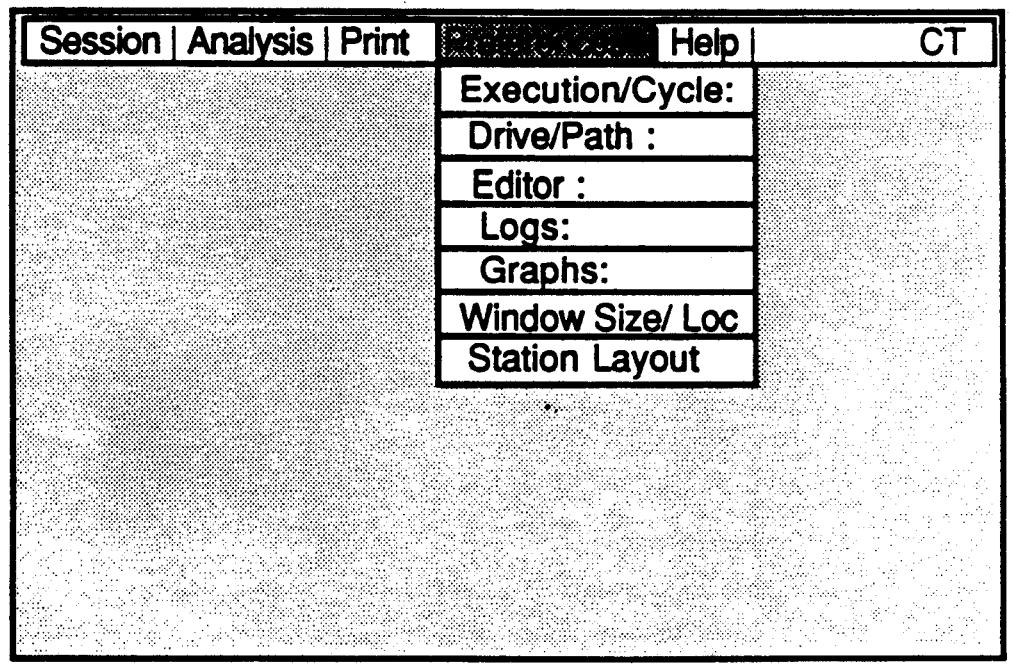
Figure 4G:
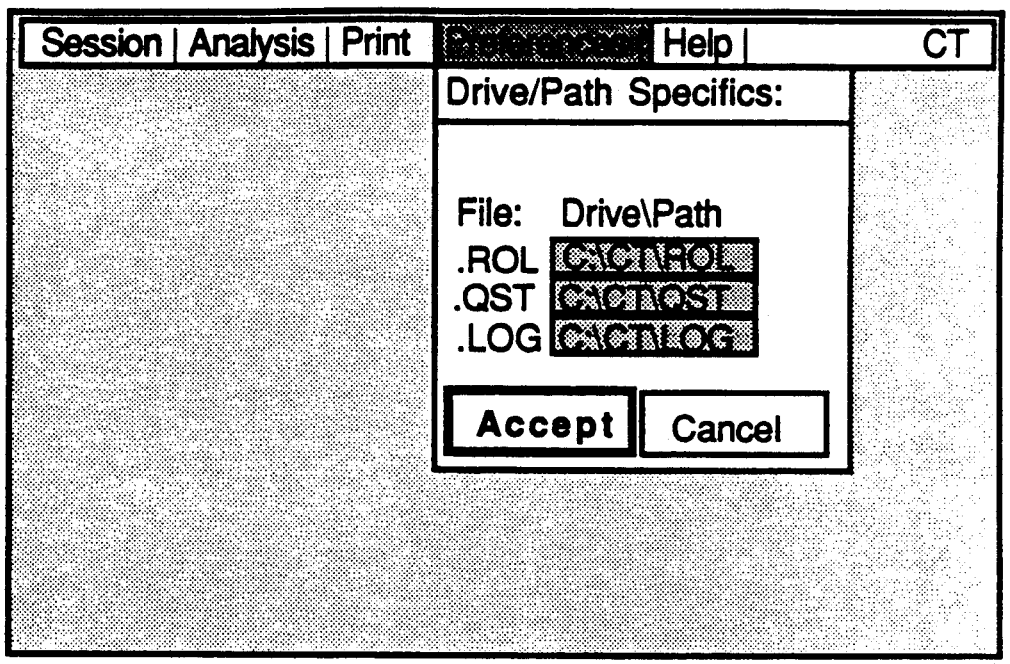
Figure 4H:
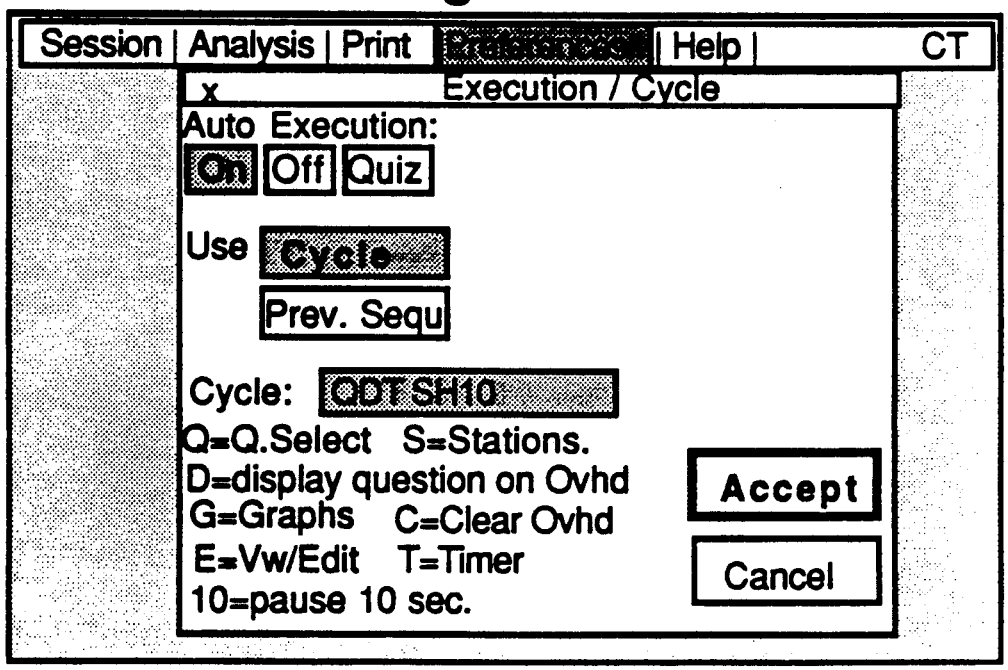
Figure 4I:
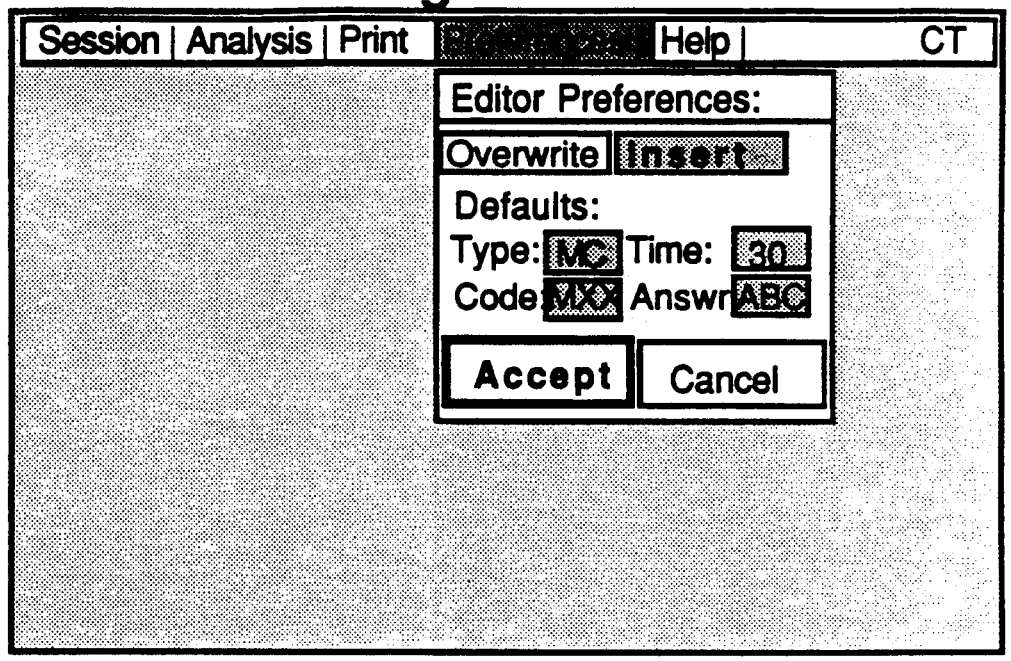

FIG. 4A shows the opening screen display of the teacher's interface program. FIG. 4B shows the display when the "Session" menu is activated to open a classroom session, and the "Quit" option is selected. FIG. 4C shows an example of a limited implementation of an "Analysis" option to enable a teacher to review class or student performance. This particular implementation is oriented towards use in class whereby the teacher may set a "filter" to select questions to be included in the analysis in one of three ways (e.g. by last n questions, by type of question, or by code number). Students then may be ranked (up or down) in one of five ways (e.g. by score, by number of questions correct, by time, by name, or by location). FIG. 4D shows an example of a "Help" facility. FIG. 4E illustrates possible combinations of "Print" capabilities. FIGS. 4F–4I show how a teacher may customize the teacher interface program by setting up "Preferences" which suit his/her own teaching style.

Figure 4J:
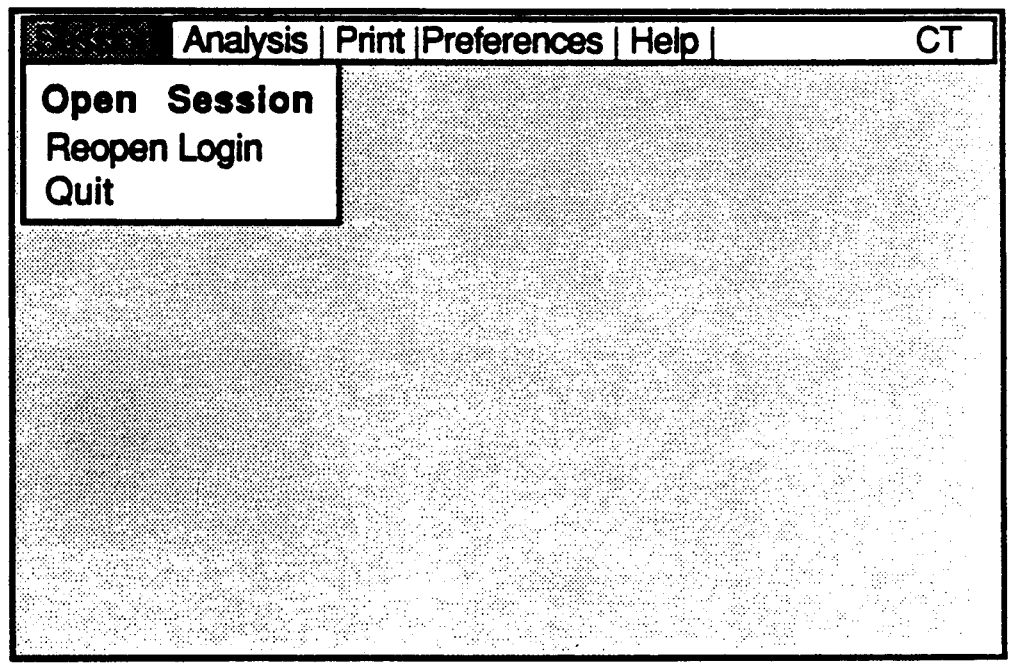
Figure 4K:
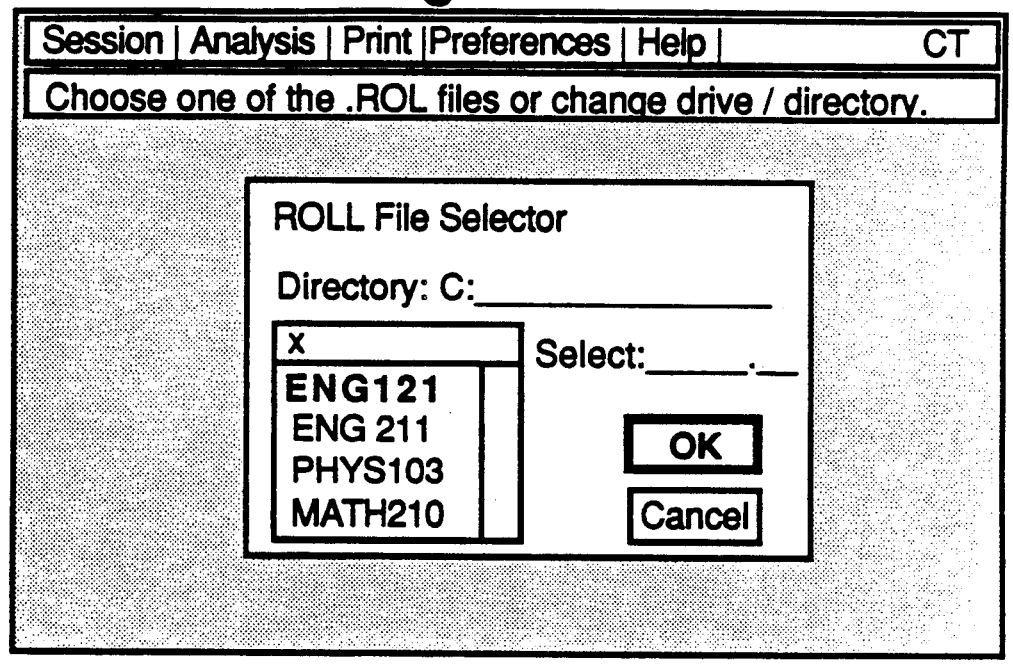
Figure 4L:
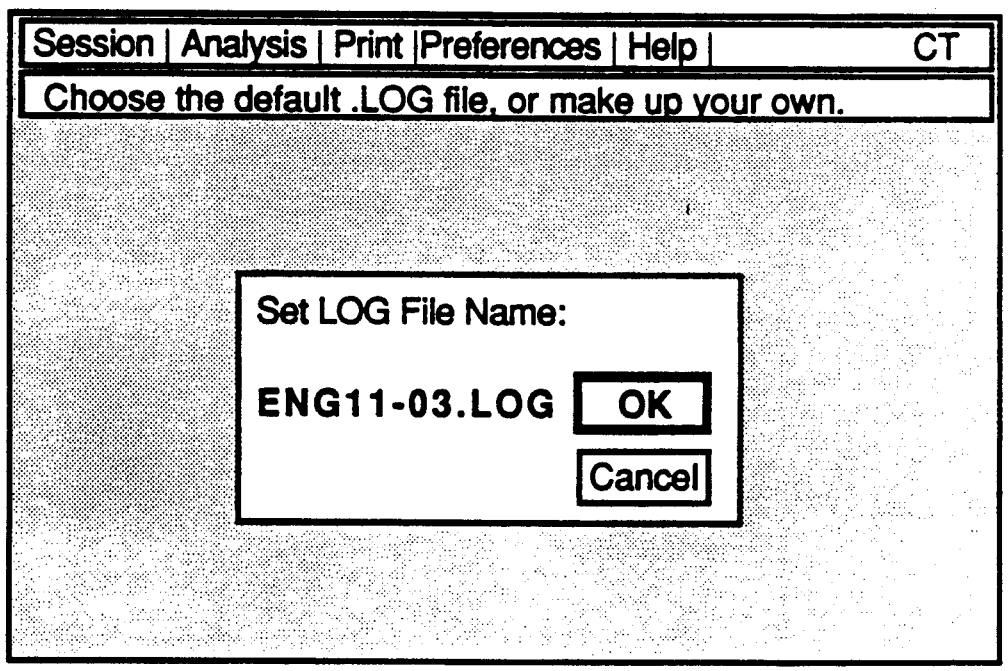
Figure 4M:
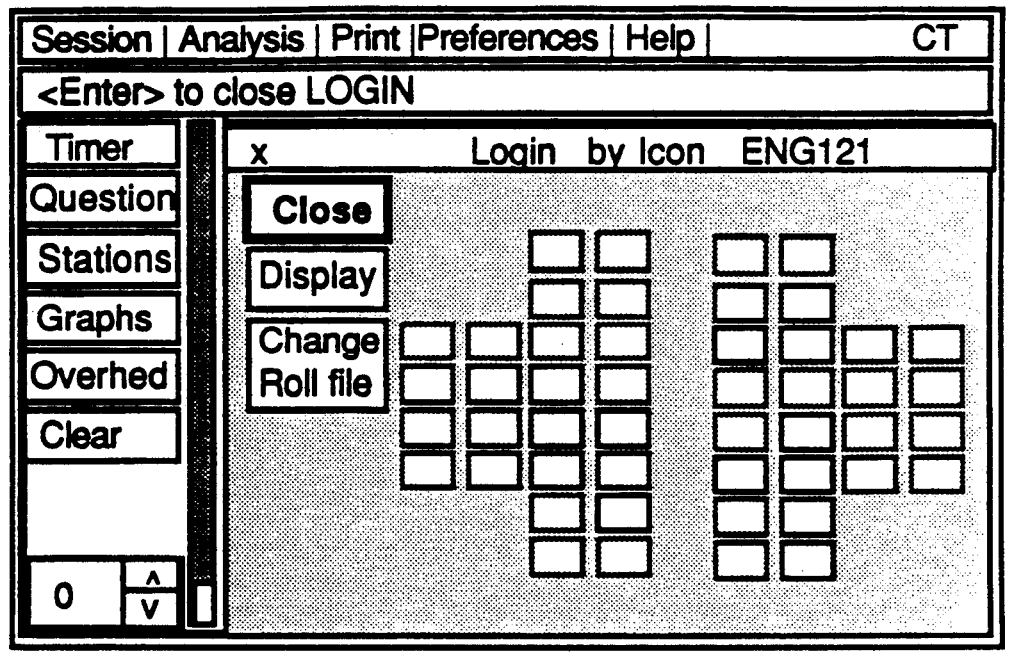
Figure 4N:
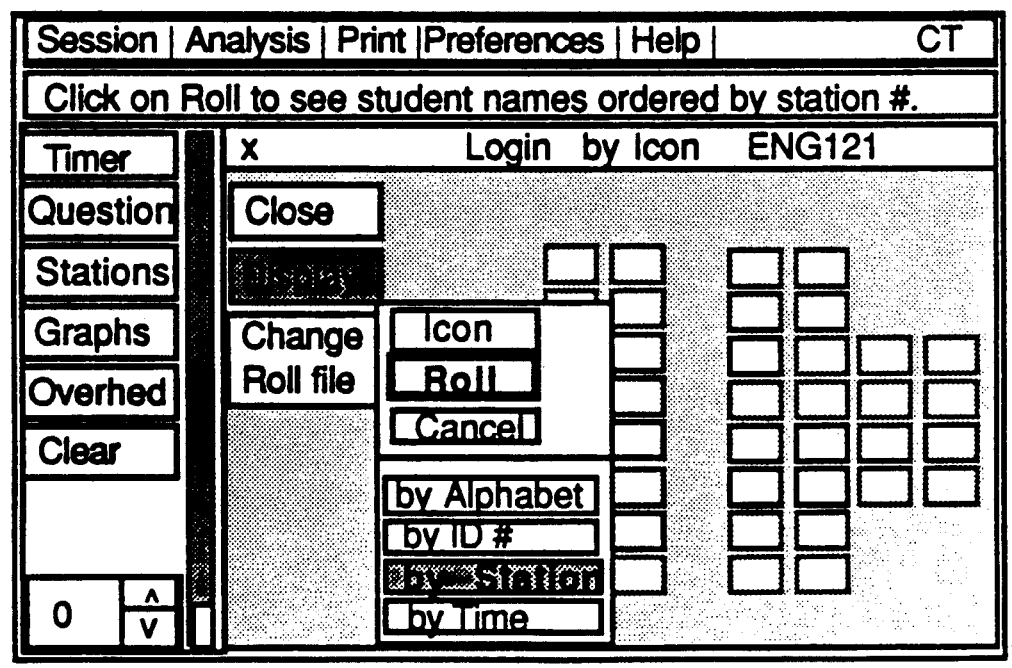

The screens contained in FIGS. 4J–4O show an example of a student login sequence at the beginning of a class. FIG. 4J shows the "Session" menu pulled down. On opening the session, the teacher is shown the student roll files which already are stored for his/her classes (FIG. 4K), and after selecting the appropriate class roll is asked to assign a name to the "LOG" which will be created in the database for this class session (FIG. 4L). As the students log in, their seating locations in the classroom are shown by a highlighted icon in the classroom map on the teacher's screen (FIG. 4M). Using the mouse, the teacher may point at any icon and be shown the names of the student or students who had logged in at that location. The teacher may change this "Icon" form of display by selecting the "Display" option button (FIG. 4N), and select the "Roll" form of display. Four possible sortings by which student login data may be displayed are also shown (a listing ordered by I.D. number, station number or time to show the students who logged in on time or late). FIG. 4O shows an example of logged in students listed by station number with absent students at the end.

Figure 4P:
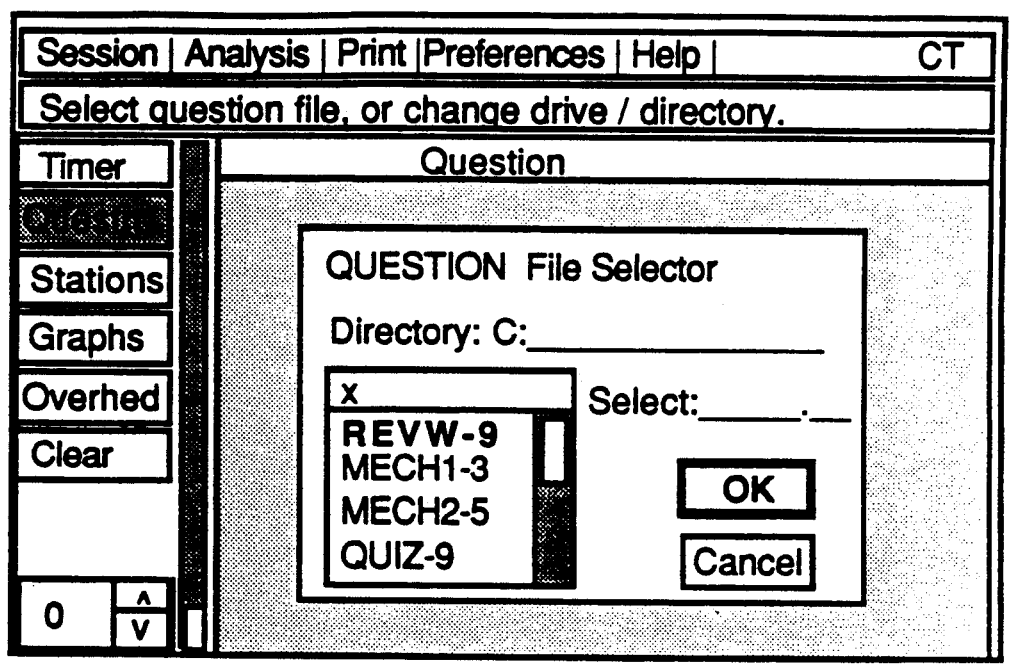
Figure 4Q:
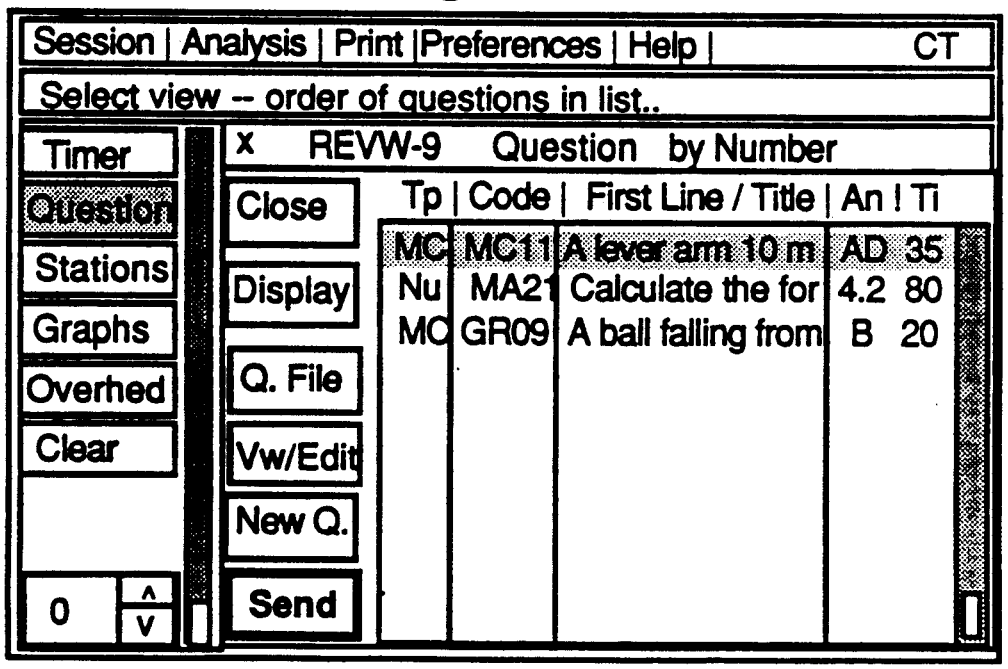
Figure 4R:
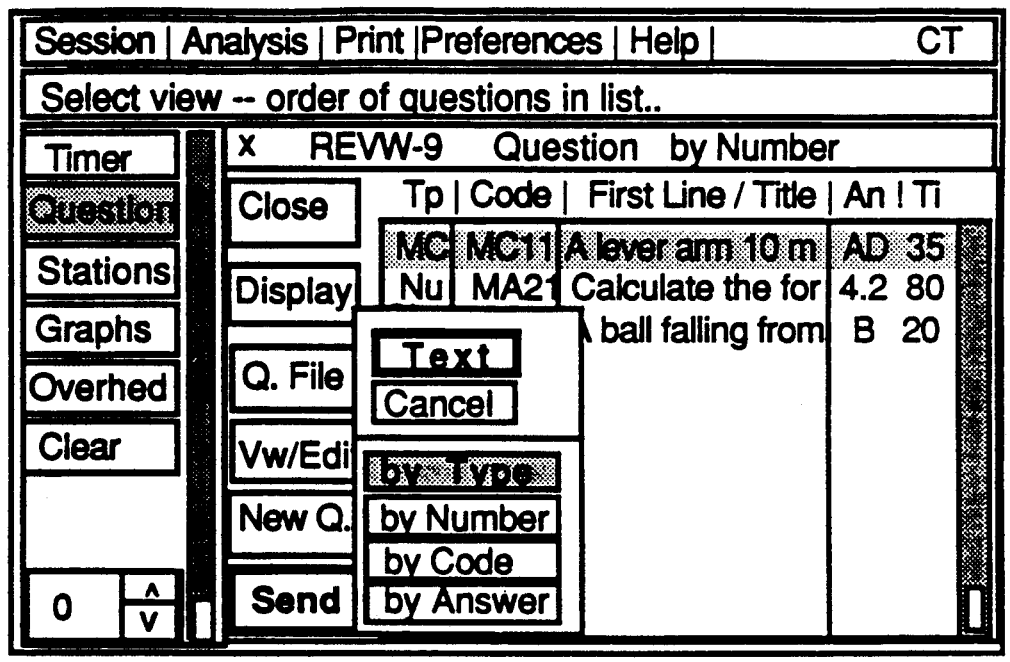

After completion of login, the teacher may select a question file which was previously prepared for this class, as shown in FIG. 4P. He/she may then scan through the questions on that file, as shown in FIG. 4Q, and optionally may sort them by question type (FIG. 4R). He/she may also view and/or edit any of these questions, or may enter a new question by selecting the appropriate menu options. New questions also may be simply read, written on the blackboard, or asked in any of the usual ways. Only the question type and the correct answer need be entered into the computer. If didactic programs or other instructional activities also are contained on this file, then they also would be shown on the index, as shown in FIG. 4Q. Information representative of the highlighted question (or program or other instructional activity) is sent in its appropriate respective form to student terminals by selecting the "Send" option on the menu (FIG. 4R). This action also simultaneously sends a string of text and/or graphic information in the appropriate form for this type of question to the overhead projector. Also shown on the overhead projector is a clock which shows students the time remaining to answer the question (FIG. 4S).

At this point the "question asked counter" in the lower left portion of the screen is updated to show that the first question has been asked. The question asked counter and associated scroll bar comprise a review feature that enables the teacher to recall information and response data on previous questions that have been asked, as was discussed above.

Figure 4S:
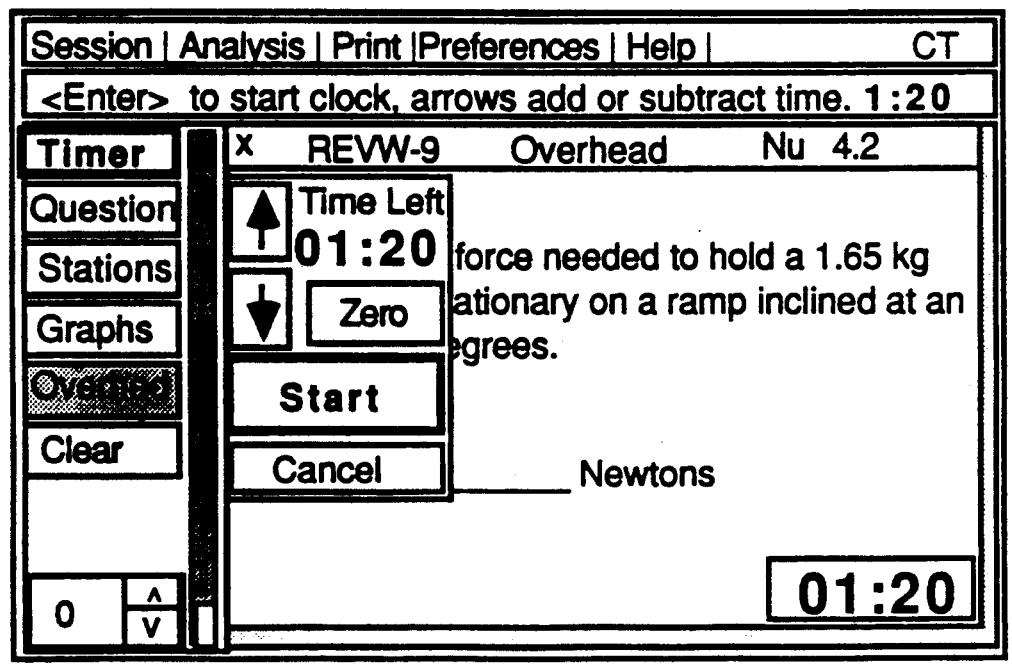
Figure 4T:
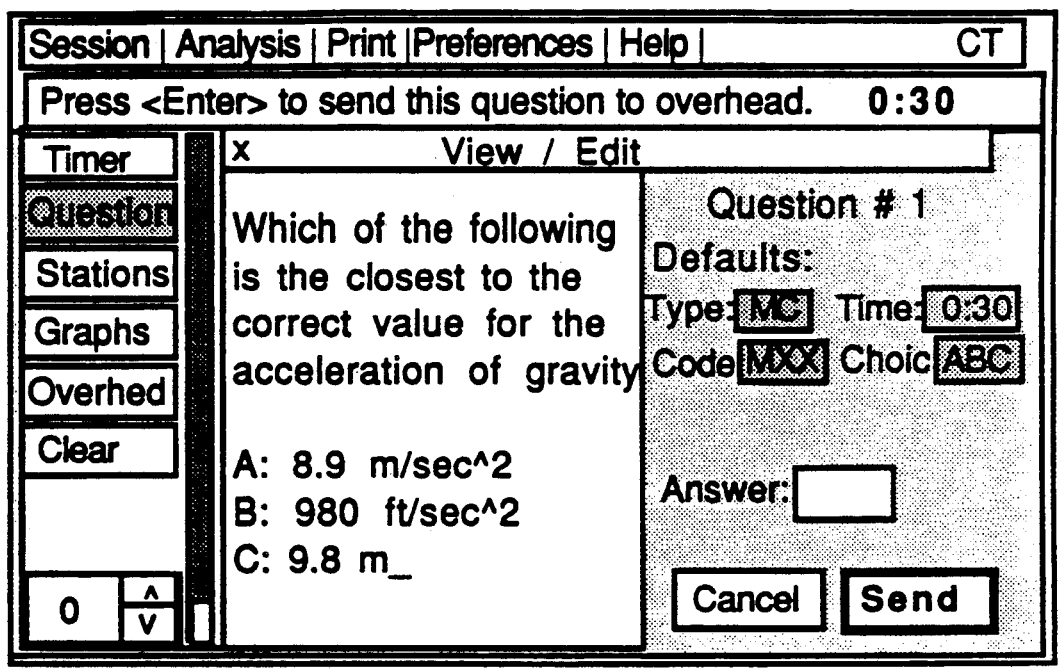
Figure 4U:
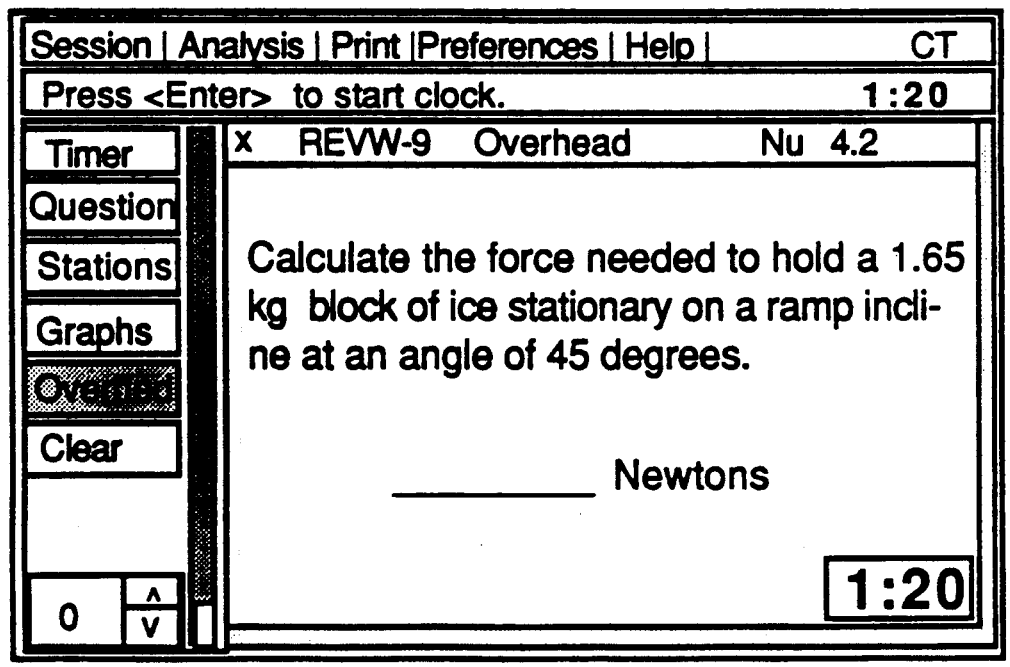
Figure 4V:
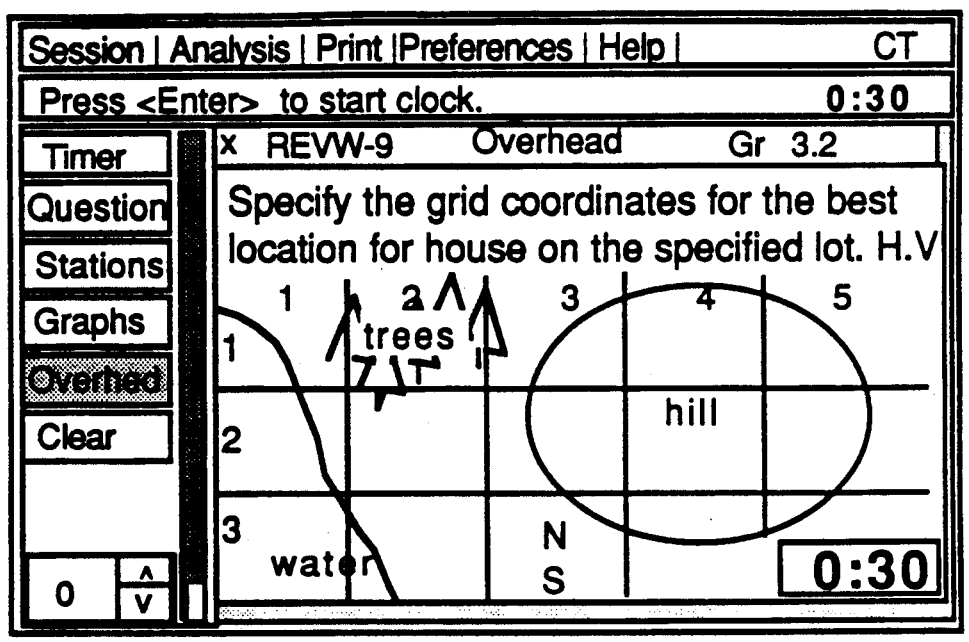
Figure 4W:
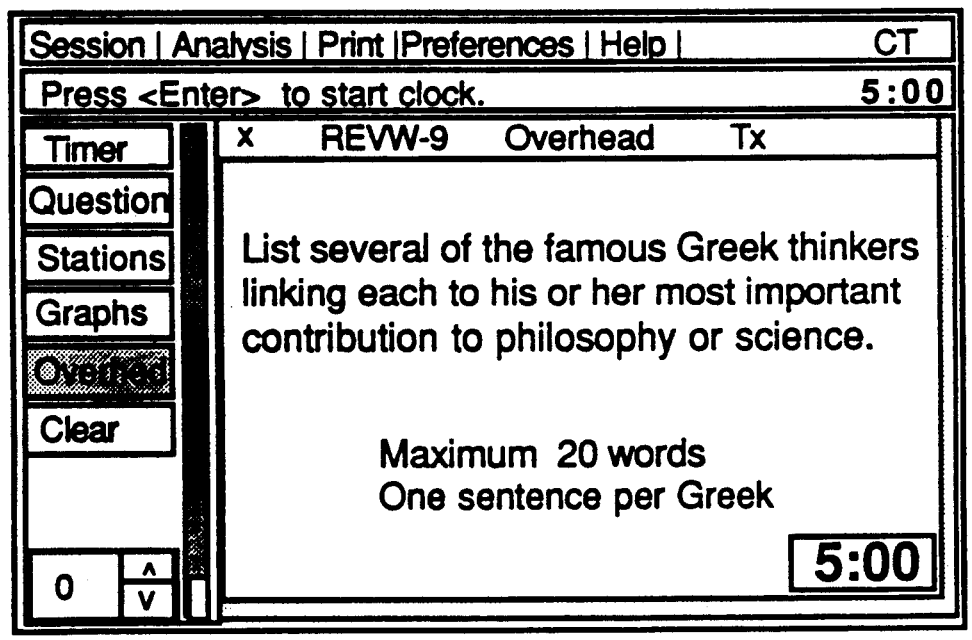
Figure 4X:
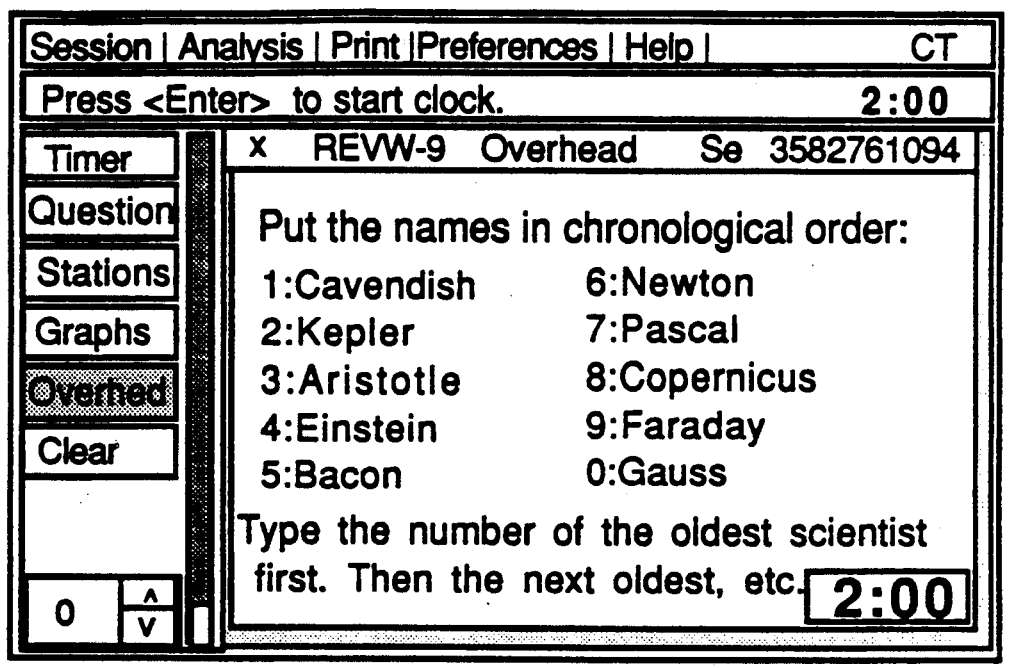

An example of the editor function is shown in FIG. 4T for a multiple choice question, and examples of the overhead projector display formats for four different question types are shown in FIG. 4U (Numeric), FIG. 4V (Grid), FIG. 4W (Essay/Narrative), and FIG. 4X (Sequence Ordering).

The teacher now may start the timer (as shown in FIG. 4S) to allow the students to begin answering the question. At any time the teacher may increase or decrease the remaining time on the question. The teacher also may view the information as shown on the overhead projector, on the screen as shown in FIG. 4S.

Figure 4Y:
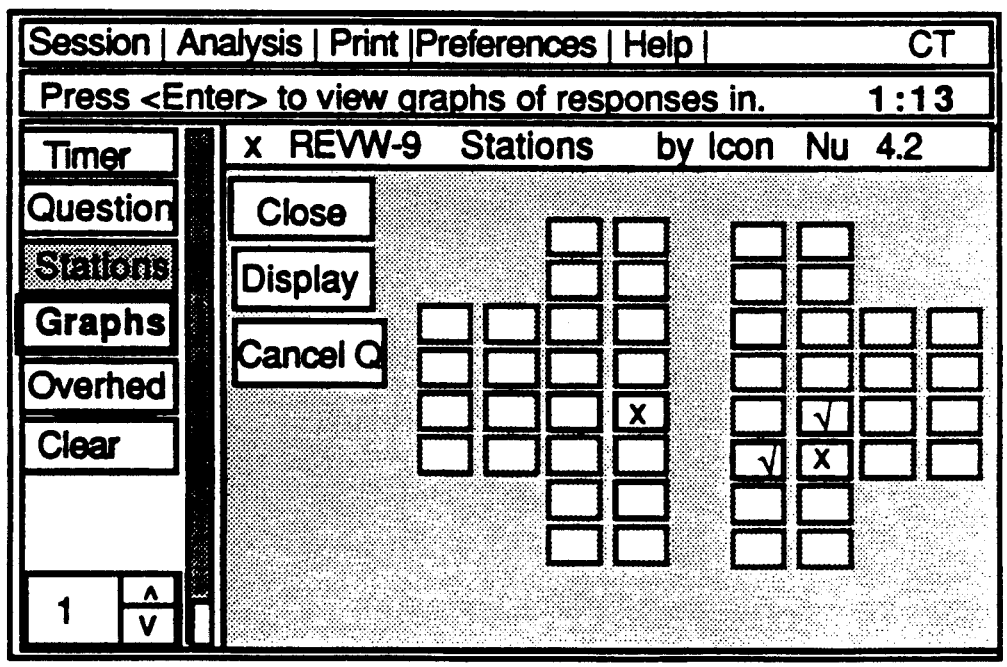
Figure 4Z:
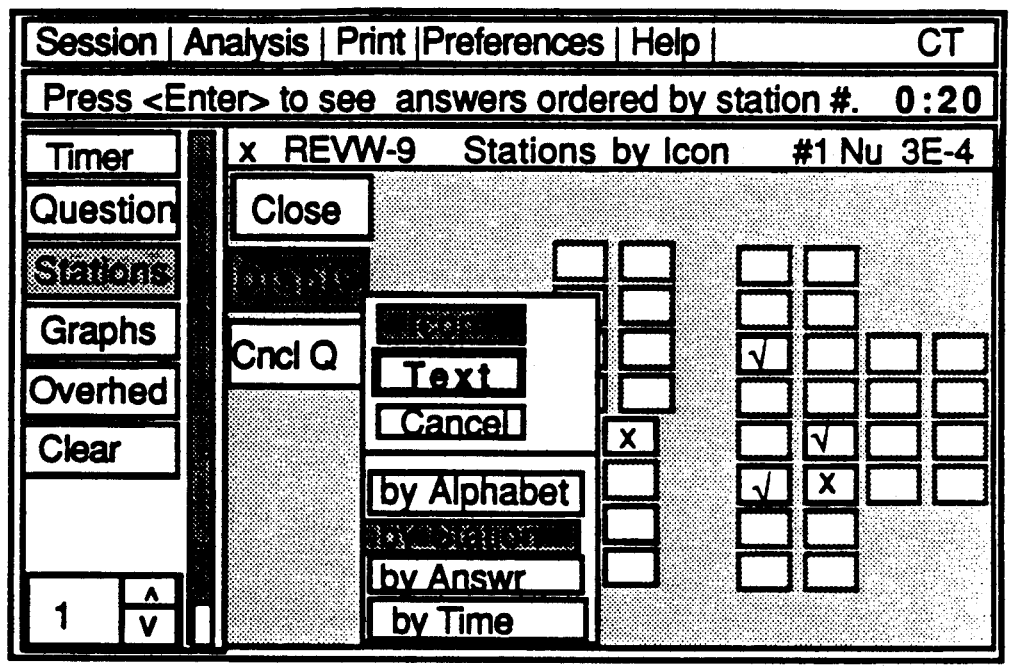
Figure 4A:
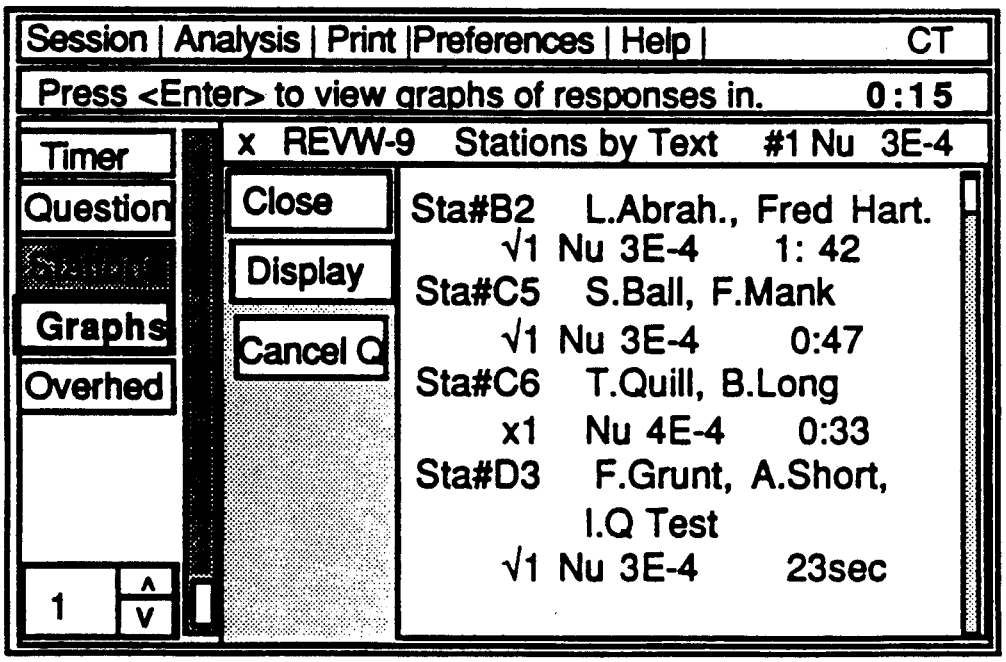
Figure 4B:
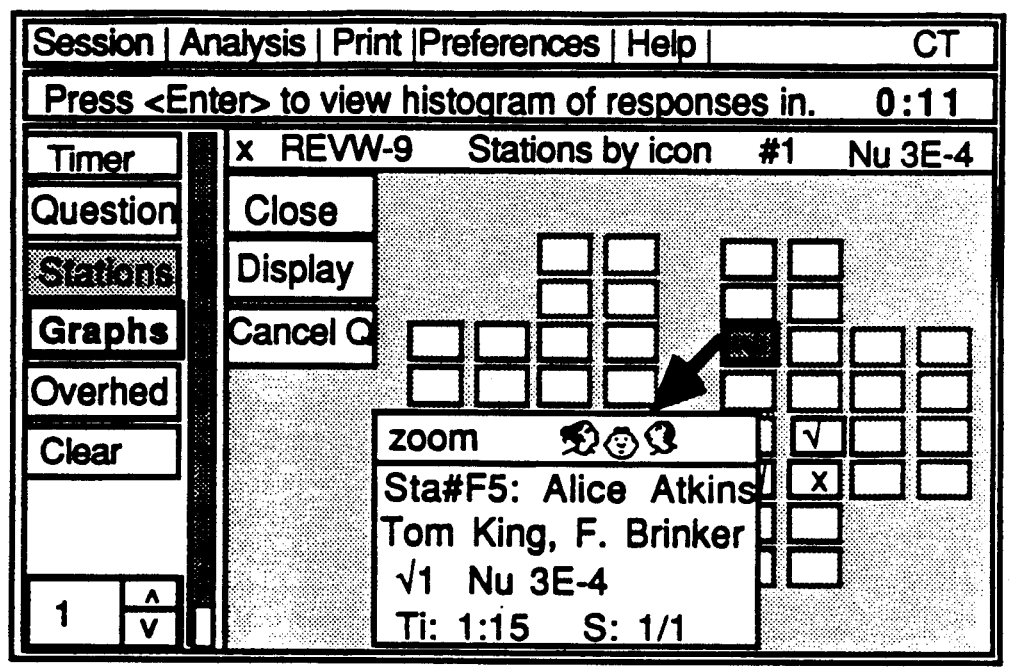
Figure 4C:
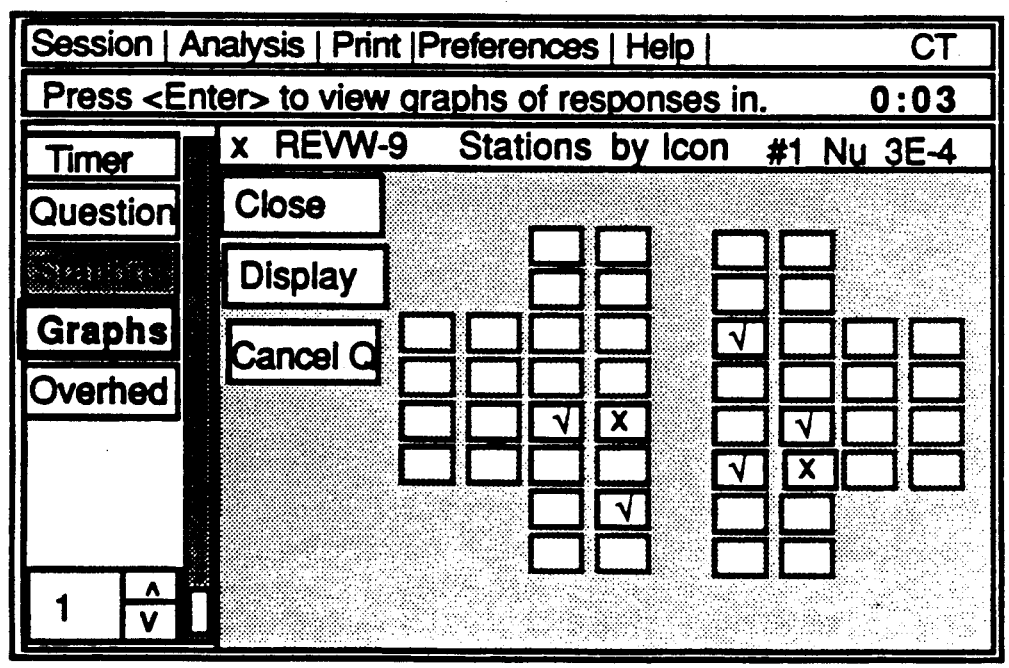
Figure 4D:
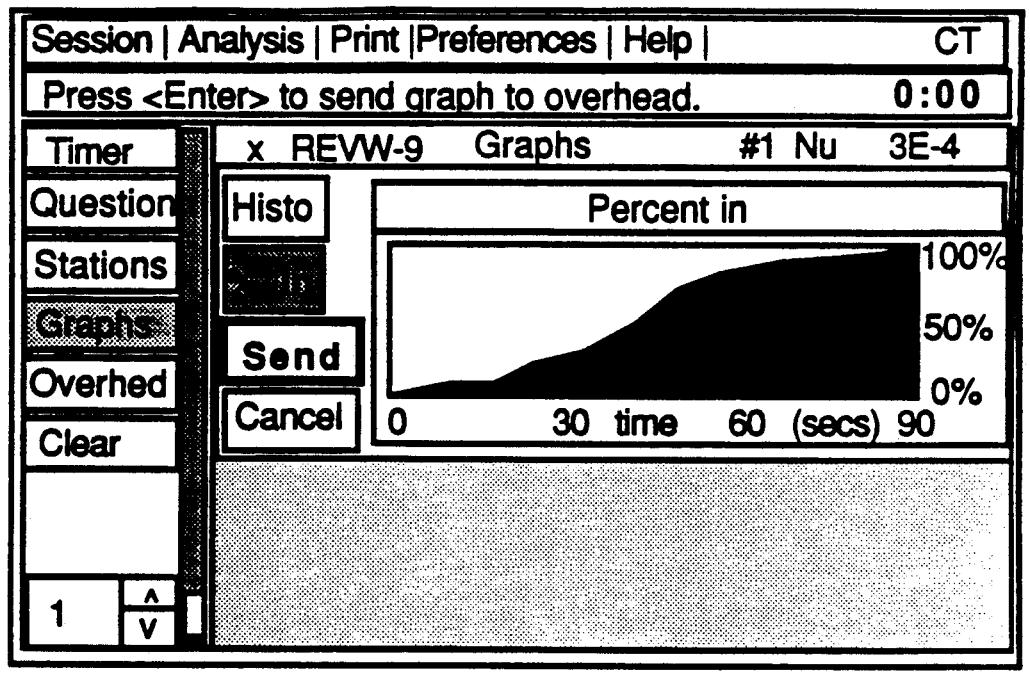
Figure 4E:
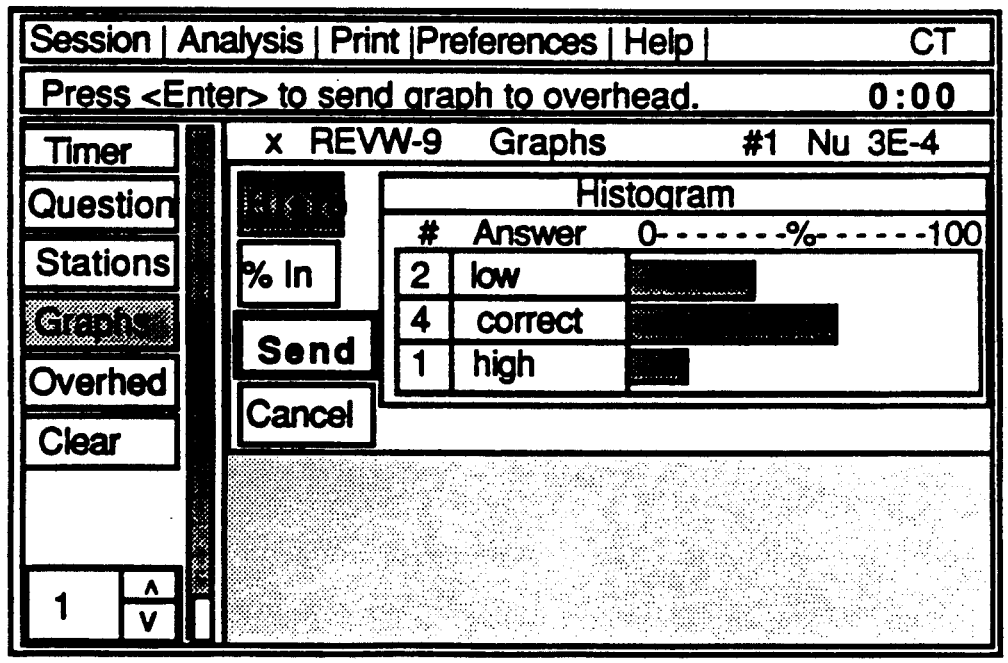

When the students begin answering the question the teacher may view their incoming responses via the response window in icon mode as shown in FIG. 4Y. The teacher also may view responses of individual students to current and prior questions in a particular area of the classroom by simply pointing to that area or at the icon representing a particular student (FIGS. 4Z-4BB). The teacher also may view the percentage of responses in one of two graphic representations (histogram or %In). FIGS. 4CC-4EE show the process for for a numeric type question. FIG. 4DD showing a %In representation, and 4EE showing a histogram.

Figure 5A:
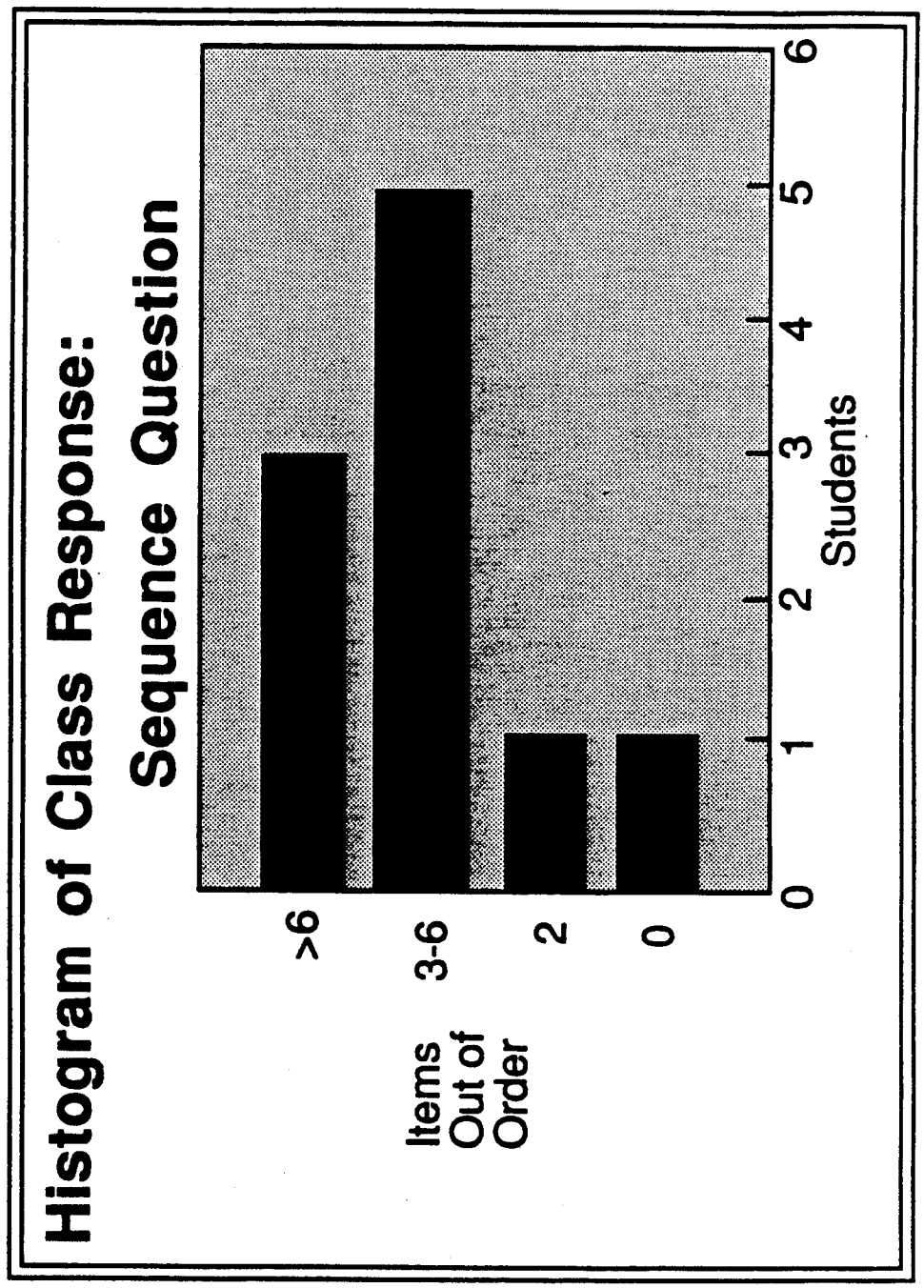
FIGS. 5A-5B are exemplary histograms showing results of a student-interactive classroom session.
Figure 5B:
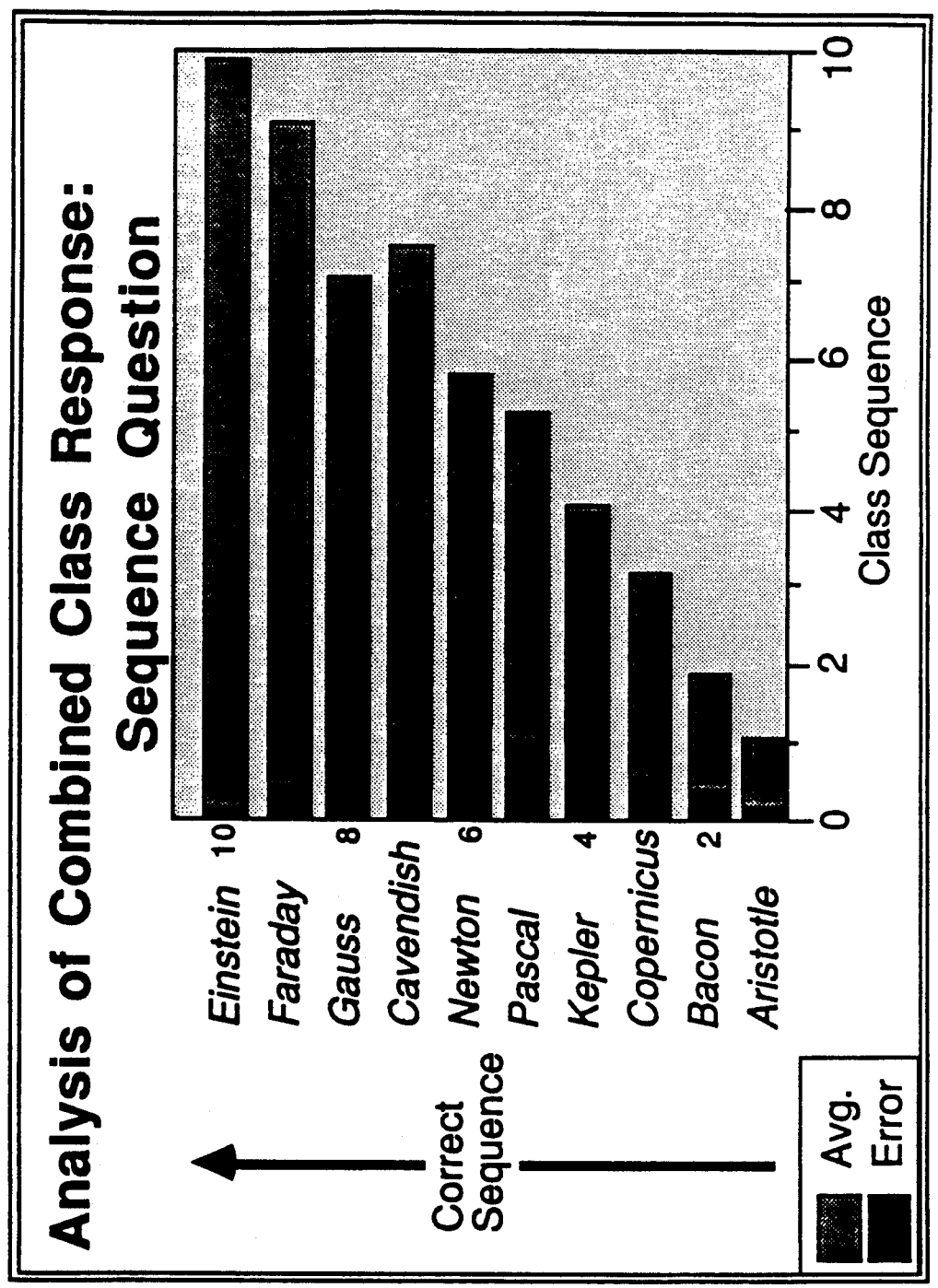

The types of graphical analysis appropriate for viewing student responses are dependent on question type, each question type automatically generating its own appropriate forms of graphical representation for the teachers selection option. For example, graphical analyses of student responses to the sequencing question shown in FIG. 4X are contained in FIGS. 5A and 5B. Here, two histograms are shown. The first histogram shows four bars, the first depicting the number of students who get the correct sequence. Successive bars show the number of students who had two names out of order, three to six names out of order, and more than six names out of order.

The second histogram shows the combined class response with the average error. The combined response matches the correct order except for mixing up Cavendish and Gauss. The error bars show that on average, there was a high certainty that Aristotle was first and Einstein last, but that in the middle of the range (especially from Kepler to Gauss) a much lower certainty (higher uncertainty) existed regarding the correct ordering.

The other major category of analysis of data stored on the system may take place primarily outside class. It is considered to be within the scope of the invention that such data stored on the system during class (perhaps even for an entire course) may be stored in a format so as to be accessible either by a special purpose analysis program, or by a standard commercial data base manager (such as the dBase(tm), RBase(tm), Paradox(tm), or FoxBase(tm)) data base manager programs, or by a spreadsheet program (such as the Lotus 1-2-3(tm), Quattro(tm), Symphony(tm), or Excel(tm)) spreadsheet programs. Other data base managers and spreadsheet programs may be used; the listing given here is not intended to be exhaustive.

This capability permits a teacher to follow the progress of individual students, to diagnose their strengths and weaknesses, and to provide remedial action where appropriate. It also may permit a teacher to compare students' understanding of particular topics, and to assign grades automatically.

While the present invention has been described in detail with reference to a particular embodiment, and to other options presently known to the inventors, the invention should not be considered as limited thereto or thereby. Various modifications within the spirit and scope of the invention will be apparent to ordinarily skilled artisans. Thus the invention should be considered as limited only by the scope of the appended claims, which follow immediately.

What is claimed is:

1. An interactive electronic classroom system, comprising:
   a central computer, including a central processor, a monitor, and associated peripheral hardware, for running individual classroom programs, including programs which accept sequences of input associated with student tasks to which students provide responses, said central computer storing said programs and said responses and providing analyses of said responses, under control of the teacher, via said programs for display on said monitor;
   a plurality of student terminals, each including a microprocessor, input means for inputting information, and a display, for receiving said student tasks from said central computer, for executing said student tasks by students to provide said responses, for transmitting said responses to said central computer, and for providing feedback to the students;
   network means for transmitting data between said central computer and said plurality of student terminals, said data including said student tasks and said responses;
   a communication protocol, associated with said central computer, said network means, and said plurality of student terminals, for transmitting said data between said central computer and said plurality of student terminals, for downloading of ones of said student tasks from said central computer to said plurality of student terminals, and for transmitting said responses from said plurality of student terminals to said central computer;

activation means, associated with said central computer, said plurality of student terminals, said network means, said communication protocol, and said individual classroom programs, for allowing the teacher to initiate and terminate said student tasks on said interactive electronic classroom system, such that each of said plurality of student terminals provides said responses to said student tasks at a pace that is under the control of the teacher, with said responses being transmitted to and monitored by said central computer;

viewing and analyzing means for viewing and analyzing said responses; and electronic display means for displaying information, by the teacher to the students.

2. A system as claimed in claim 1, wherein said activation means further comprises means for pacing said student tasks at a pace that is under the control of both the teacher and each of the students.

3. A system as claimed in claim 1, wherein said activation means further comprises means for enabling a teacher to specify a time duration for provision of said responses to ones of said student tasks.

4. A system as claimed in claim 1, wherein ones of said classroom programs comprise means for enabling the teacher, during a class, to select, retrieve, and use said sequences of input.

5. A system as claimed in claim 4, wherein said ones of said classroom programs comprise means for enabling selection, retrieval, and use of a subset of any of said sequences of input.

6. A system as claimed in claim 1, wherein said ones of said classroom programs further comprise means for enabling the teacher, during a class, to enter, in real time, a new sequence of input.

7. A system as claimed in claim 1, wherein said viewing and analyzing means further comprises means for viewing and analyzing said responses to said student tasks which were previously executed.

8. A system as claimed in claim 1, wherein said communication protocol allows transmission of said data between said central computer and said plurality of student terminals, both selectively and collectively, and among said plurality of student terminals themselves, both selectively and collectively.

9. A system as claimed in claim 1, further comprising database means for storing class records and said responses in accordance with a selectable format.

10. A system as claimed in claim 9, wherein said database means includes means for storing class rolls, student attendance records, and said sequences of input.

11. A system as claimed in claim 1, wherein said viewing and analyzing means includes means for viewing and analyzing said responses both during and after a classroom session.

12. A system as claimed in claim 1, wherein said viewing and analyzing means includes means for viewing and analyzing responses to said student tasks in accordance with the type of student task.

13. A system as claimed in claim 1, further comprising preparation means for enabling preparation of said sequences of input for use during a class, and for storing said sequences of input for later use.

14. A system as claimed in claim 13, wherein said preparation means comprises means for displaying teacher choices in a menu format.

15. A system as claimed in claim 13, wherein said preparation means comprises language means, selected from the group consisting of high level programming languages, low level programming languages, and computer-responsive languages, for enabling preparation of said sequences of input.

16. A system as claimed in claim 15, further comprising a subroutine library, callable by said language means, for preparing said sequences of input.

17. A system as claimed in claim 1, wherein said activation means comprises means for displaying teacher choices in a menu format.

18. A system as claimed in claim 1, further comprising grading means for enabling a teacher to assign grades to said responses.

19. A system as claimed in claim 1, further comprising logon means for identifying the students individually to the system by personal identity and by location in the classroom.

20. A system as claimed in claim 1, wherein said central computer comprises one of a personal computer and a workstation.

21. A system as claimed in claim 1, further comprising means for transmitting prerecorded video information to said electronic display means under control of the teacher for viewing by said students.

22. A system as claimed in claim 1, wherein said network means comprises a local area network (LAN).

23. A system as claimed in claim 1, wherein said student tasks are compiled from the group consisting of questions, quizzes, tests, classroom exercises, didactic programs, instructional games, simulations, and homework.

24. A system as claimed in claim 1, wherein said network means comprises at least one network controller.

25. A system as claimed in claim 1, wherein said communication protocol allows transmission of said data from said central computer to only one of said plurality of student terminals at a time.

26. A system as claimed in claim 1, wherein said communication protocol allows transmission of said data from said central computer simultaneously to a selected subset consisting of fewer than all of said plurality of student terminals.

27. A system as claimed in claim 1, wherein said communication protocol allows transmission of said data from said central computing unit simultaneously to a plurality of selected subsets each consisting of fewer than all of said plurality of student terminals.

28. A system as claimed in claim 1, wherein said activation means allows each of said plurality of student terminals to receive and respond to said student tasks at each student's own pace.

29. A system as claimed in claim 1, wherein said activation means allows all said plurality of student terminals to receive and respond to said student tasks within time limits set by the teacher.

30. A system as claimed in claim 1, wherein said activation means allows all of said plurality of student terminals within a selected subset, consisting of fewer than all of said plurality of student terminals, to receive and respond to said student tasks within time limits set by the teacher.

31. A system as claimed in claim 1, wherein said activation means allows selected subsets of said plurality of student terminals, each of said selected subsets consisting of fewer than all of said plurality of student terminals, to receive and respond to said student tasks within time limits set by the teacher.

32. A system as claimed in claim 1, wherein said electronic display means comprises a display selected from the group consisting of a liquid crystal display a color television, and a color television projector.

33. A system as claimed in claim 3, wherein said activation means further comprises means for changing said time duration.

34. A system as claimed in claim 1, wherein said sequences of input include at least one predetermined time duration for provision of said responses.

35. A system as claimed in claim 1, wherein said sequences of input are input to said central computer via devices compiled from the group consisting of a keyboard, pointing device, floppy disk, hard disk, optical disk, modem, and computer network.

36. A system as claimed in claim 1, wherein said sequences of input are compiled from the group consisting of said student tasks, student task descriptions, student task time limits, computer programs, enhanced viewing and analyzing tools for specific student tasks, graphic images, and video and audio sequences.

37. A system as claimed in claim 1, wherein at least one of said student terminals includes means for providing narrative responses to said student tasks.

38. A system as claimed in claim 1, wherein said viewing and analyzing means includes means for viewing and analyzing responses to said student tasks outside class on a separate computer that is separate from remaining elements of said interactive electronic classroom system.

39. A system as claimed in claim 38, further comprising additional networking means for networking said separate computer to said central computer.

40. A system as claimed in claim 1, wherein at least one of said student terminals is portable and comprises means for performing at least one function selected from the group consisting of computer, calculator, organizer, appointment diary, typewriter, phone directory, alarm clock, thesaurus, and dictionary.

41. A system as claimed in claim 1, wherein ones of said student tasks include programs, executing on said student terminals, for providing local analyses of said responses and for providing individual instructions and feedback to the students.

42. A system as claimed in claim 1, wherein said data transmitted by said network means under said communication protocol includes said information for display by said electronic display means.

43. A system as claimed in claim 1, wherein said network means includes means for transmitting said data by electromagnetic waves.

44. A system as claimed in claim 30, wherein said activation means allows ones of said plurality of student terminals, other than those in said selected subset, to receive and respond to said student tasks at each respective student's own pace.

45. A system as claimed in claim 31, wherein said activation means allows ones of said plurality of student terminals other than those in said selected subsets to receive and respond to said student tasks at each respective student's own pace.

46. A system as claimed in claim 1, wherein said electronic display means comprises means for enabling display of said information, by the teacher to the students, at the display at each of said plurality of student terminals.

47. A system as claimed in claim 1, wherein said electronic display means comprises means for playing segments of prerecorded video and audio information under control of said central computer, said segments being selected in accordance with said sequences of input and said responses.

48. A system as claimed in claim 24, further comprising means for enabling at least one microprocessor from said plurality of student terminals to act as a microcontroller with said network controller.

49. A system as claimed in claim 1, wherein said electronic display means comprises means for displaying analyses of said responses to said student tasks.

* * * * *

UNITED STATES PATENT AND TRADEMARK OFFICE
CERTIFICATE OF CORRECTION

PATENT NO. : 5,002,491

DATED : March 26, 1991

INVENTOR(S) : A. Louis Abrahamson et al

Page 1 of 2

It is certified that error appears in the above-identified patent and that said Letters Patent is hereby corrected as shown below:

On the title page:     please correct the Inventors

--  [75]     Inventors:  A. Louis Abrahamson; Frederick F. Hartline; Milton G. Fabert, all of Grafton, Va.; Michael J. Robson, Harare, Zimbabwe; Robert J. Knapp, Hampton, Va.--

Col. 15, line 68, delete "shown" and insert --referred to--.

Figure 40:
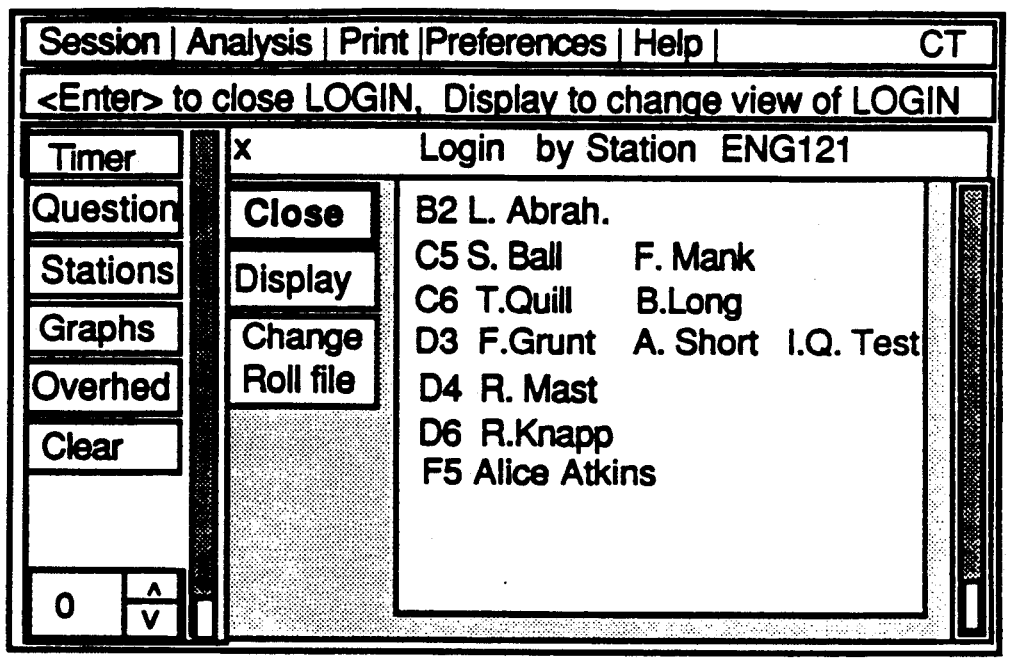
Figure 40:
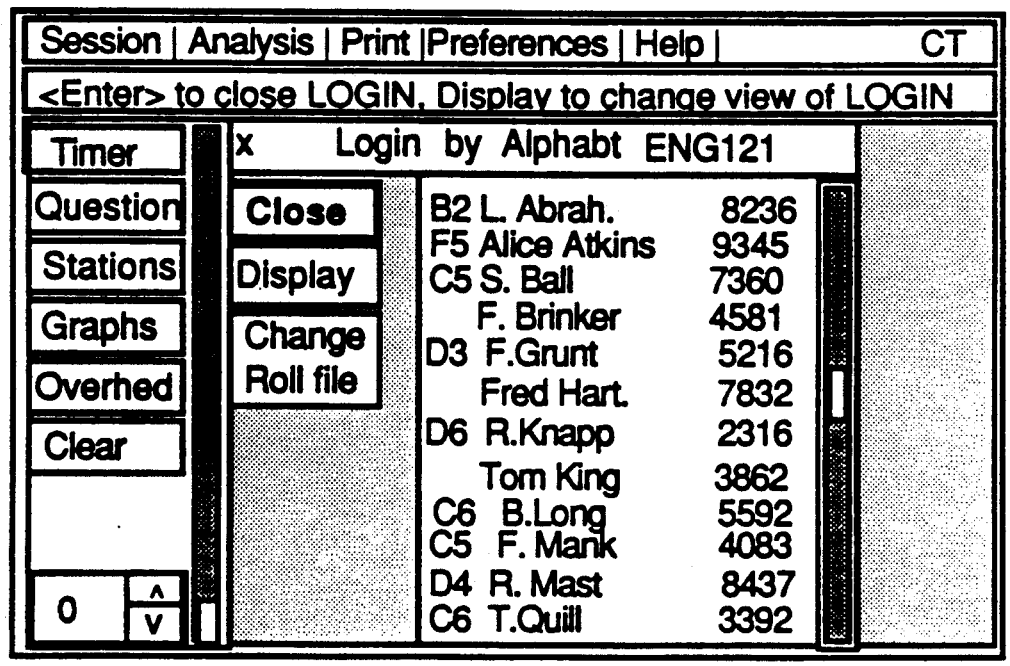

Col. 16, line 2, delete "12" and insert --1--;

lines 15-18, delete ".  The number "12" is shown in some of the screens because, in the loop shown in the lower two rows of screens, the number will change depending on the question." and insert --, and will increment each time a question is asked or a task is executed.--;

lines 67-68, delete "with absent students at the end." and insert --.  Figure 40' shows the class listed alphabetically with absent students missing a station number.--.

UNITED STATES PATENT AND TRADEMARK OFFICE
CERTIFICATE OF CORRECTION

PATENT NO. : 5,002,491

DATED : March 26, 1991

INVENTOR(S) : A. Louis Abrahamson et al

It is certified that error appears in the above-identified patent and that said Letters Patent is hereby corrected as shown below:

Col. 17, line 24, delete "At this point" and insert --When the timer (Figure 4S) is started--;

line 25, after "updated", insert --(Figs. 4Y-4EE)--;

line 45, after "4Y", insert --, or text mode (Figs. 4Z-4AA)--;

line 49, delete "FIGS." and insert --FIG.--;

line 50, delete "4Z-".

Signed and Sealed this

Sixteenth Day of November, 1993

Attest:

BRUCE LEHMAN

*Attesting Officer*    *Commissioner of Patents and Trademarks*

(12) EX PARTE REEXAMINATION CERTIFICATE (8849th)

United States Patent
Abrahamson et al.

(10) Number: US 5,002,491 C1
(45) Certificate Issued: Feb. 14, 2012

(54) ELECTRONIC CLASSROOM SYSTEM ENABLING INTERACTIVE SELF-PACED LEARNING

(75) Inventors: A. Louis Abrahamson, Grafton, VA (US); Frederick F. Hartline, Grafton, VA (US); Milton G. Fabert, Grafton, VA (US); Michael J. Robson, Harare (ZW); Robert J. Knapp, Hampton, VA (US)

(73) Assignee: Better Education Inc., Grafton, VA (US)

Reexamination Request:
No. 90/011,449, Jan. 20, 2011

Reexamination Certificate for:
Patent No.: 5,002,491
Issued: Mar. 26, 1991
Appl. No.: 07/344,627
Filed: Apr. 28, 1989

Certificate of Correction issued Nov. 16, 1993.

(51) Int. Cl.
*G09B 03/00* (2006.01)

(52) U.S. Cl. .................. 434/322; 434/323; 434/324; 434/336; 434/350

(58) Field of Classification Search .............. 434/322
See application file for complete search history.

(56) References Cited

To view the complete listing of prior art documents cited during the proceeding for Reexamination Control Number 90/011,449, please refer to the USPTO's public Patent Application Information Retrieval (PAIR) system under the Display References tab.

*Primary Examiner* — M. Sager

(57) ABSTRACT

An interactive electronic classroom system for enabling teachers to teach students concepts and to receive immediate feedback regarding how well the students have learned the concepts. Structure is provided for enabling students to proceed in lockstep or at their own pace through exercises and quizzes, responding electronically to questions asked, the teacher being able to receive the responses, and to interpret a readout, in histogram or other graphic display form, of student responses. In a preferred embodiment, a central computer using an IBM AT (tm) compatible system is employed, together with a plurality of student computers which range from simple devices to full fledged personal computers. Optical peripheral hardware, such as VCRs or other recording/reproducing devices, may be used to provide lessons to students in association with the computer network.

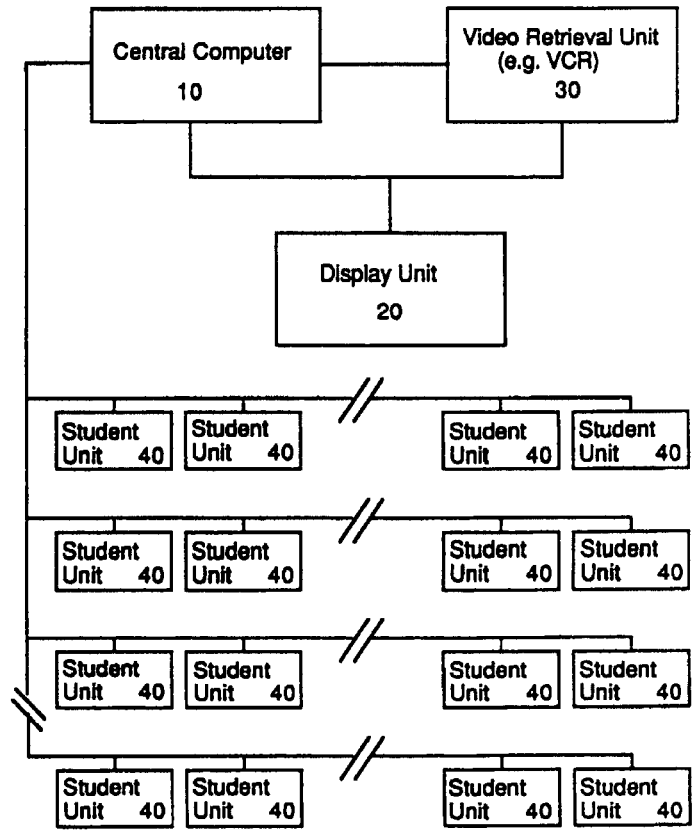

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1-7 and 9-49 is confirmed.

Claim 8 was not reexamined.

* * * * *